(12) United States Patent
Oh et al.

(10) Patent No.: US 9,946,509 B2
(45) Date of Patent: Apr. 17, 2018

(54) APPARATUS AND METHOD FOR PROCESSING AUDIO SIGNAL

(71) Applicant: Gaudio Lab, Inc., Seoul (KR)

(72) Inventors: Hyunoh Oh, Seongnam-si (KR); Taegyu Lee, Seoul (KR); Jaesung Choi, Seoul (KR); Yonghyun Baek, Seoul (KR)

(73) Assignee: Gaudio Lab, Inc., Seoul (KR)

( * ) Notice: Subject to any disclaimer, the term of this patent is extended or adjusted under 35 U.S.C. 154(b) by 0 days.

(21) Appl. No.: 15/356,530

(22) Filed: Nov. 18, 2016

(65) Prior Publication Data

US 2017/0139669 A1    May 18, 2017

(30) Foreign Application Priority Data

Nov. 18, 2015  (KR) .................. 10-2015-0162125

(51) Int. Cl.
| | |
|---|---|
| H04R 1/10 | (2006.01) |
| G06F 3/16 | (2006.01) |
| H04R 29/00 | (2006.01) |
| H04R 3/12 | (2006.01) |

(52) U.S. Cl.
CPC .............. *G06F 3/165* (2013.01); *H04R 3/12* (2013.01); *H04R 29/001* (2013.01)

(58) Field of Classification Search
CPC .......... G06F 3/165; H04R 3/12; H04R 29/001
See application file for complete search history.

(56) References Cited

U.S. PATENT DOCUMENTS

2014/0321682 A1*  10/2014  Kofod-Hansen .... H04R 25/305
                                                           381/315

* cited by examiner

*Primary Examiner* — Simon King
(74) *Attorney, Agent, or Firm* — Park, Kim & Suh LLC

(57) ABSTRACT

An embodiment of the present disclosure provides an audio signal processing device configured to transmit/receive an audio signal to/from an external acoustic output device that includes a microphone and an acoustic output means, including a transmission/reception module configured to transmit/receive a signal to/from the external acoustic output device, and a processor configured to control an operation of the transmission/reception module, wherein the processor transmits an audio output signal to the external acoustic output device through the transmission/reception module, receives, through the transmission/reception module, an input signal to which an external acoustic collected through the microphone is converted while the acoustic output means outputs an acoustic based on the audio output signal, and compares the audio output signal with the input signal to determine whether a user wears the acoustic output means of the external acoustic output device.

16 Claims, 18 Drawing Sheets

APPARATUS AND METHOD FOR PROCESSING AUDIO SIGNAL

CROSS-REFERENCE TO RELATED APPLICATION

This application claims priority to and the benefit of Korean Patent Application No. 10-2015-0162125 filed in the Korean Intellectual Property Office on Nov. 18, 2015, the entire contents of which are incorporated herein by reference.

TECHNICAL FIELD

The present disclosure relates to an audio signal processing method and device, and more particularly, to an audio signal processing method and device for determining whether a user is wearing an acoustic output device.

BACKGROUND ART

Recent user interface technology is related to an electrical-electronic processing technique for sensing/predicting/interpreting a behavior or intention of a user. In other words, the user interface technology may be said to detect all minor actions of the user, guess an intention inherent in the action of the user, and realize an electrical-electronic processing method corresponding to the intention to assist the user to manipulate a device more easily. A touch screen of a smartphone may be said to be a representative example of the recent user interface. For example, when the user contacts the touch screen with two fingers and then increases a distance between the two fingers, a processor of the smartphone may determine that a user intends to enlarge an image output through the touch screen. Also, the processor may perform an image processing, namely, enlargement corresponding to movements of the two fingers. Such user interface technology may be said to core technology for achieving an increase in user convenience and advancement of automation technology.

The user interface technology may be applied to all industrial fields and accordingly, may also be applied an industrial area related to producing/appreciating/sharing of content. In a view of a typical user, a user interface related to content appreciation may be usefully utilized. At this point, in a view of the user interface, whether the user currently appreciates acoustic content may be handled as important context information.

Until now, there is not an effective technique capable of easily determining whether the user is appreciating the acoustic content. In particular, since a solution capable of checking whether the user is appreciating the acoustic content only with a signal processing technique has not been suggested, a research about this is necessary.

DISCLOSURE

Technical Problem

The present disclosure provides a user interface capable of determining whether a user is appreciating acoustic content.

The present disclosure also provides a method and device capable of determining whether the user wears an acoustic output device.

Technical Solution

In accordance with an exemplary embodiment of the present disclosure, an audio signal processing device configured to transmit/receive an audio signal to/from an external acoustic output device, which includes a microphone and an acoustic output means, includes: a transmission/reception module configured to transmit/receive a signal to/from the external acoustic output device; and a processor configured to control an operation of the transmission/reception module, wherein the processor transmits an audio output signal to the external acoustic output device through the transmission/reception module, receives, through the transmission/reception module, an input signal to which an external acoustic collected through the microphone is converted while the acoustic output means outputs an acoustic based on the audio output signal, and compares the audio output signal with the input signal to determine whether a user wears the acoustic output means of the external acoustic output device.

In another embodiment, the acoustic output means may include a plurality of output unit, the audio output signal may include a plurality of individual audio signals, and the plurality of individual audio signals may be individually converted to the acoustics by the respective output unit, and the processor may individually compare the plurality of individual audio signals with the input signal to determine whether the user wears each of the output units.

In another embodiment, the plurality of individual audio signals may include respective guide signals that are different signal patterns, and the processor may individually include each of the guide signals with the input signal to determine whether the user wears each of the output units.

In another embodiment, the audio output signal may include a guide signal that is a preset signal pattern, and the processor may include the guide signal with the input signal to determine whether the user wears the acoustic output means.

In another embodiment, the audio output signal may be distinguished into the guide signal that is a signal pattern preset for determining whether the acoustic output means is worn and a non-guide signal that is not the guide signal, and the processor may compare the guide signal and the input signal, when the guide signal is included in the audio output signal, and compare the audio output signal including the non-guide signal with the input signal, when the non-guide signal is included in the audio output signal to determine whether the user wears that acoustic output means.

In another embodiment, the processor may determine whether to add the guide signal to the audio output signal based on characteristics of the audio output signal.

In another embodiment, the acoustic output means may include a plurality of output units, the audio output signal may include a plurality of individual audio signals, and the plurality of individual audio signals may be individually converted to the acoustics by the respective output units, and the processor may determine whether to add the guide signal based on a correlation between the individual audio signals.

In another embodiment, the processor may add the guide signal to the audio output signal, when the correlation between the individual audio signals is higher than a preset reference correlation, and exclude the guide signal from the audio output signal, when the correlation between the individual audio signals is lower than the preset reference correlation.

In another embodiment, the processor may calculate a detection result value representing how much the audio output signal is included in the input signal and determine that the user wears the acoustic output means, when the detection result value is equal to or greater than a preset detection limit value, and the detection limit value may be determined based on a combination of an energy of the audio output signal and an energy of an impulse response of an acoustic path between the acoustic output means and the microphone.

In accordance with another exemplary embodiment of the present disclosure, an acoustic output device includes: a transmission/reception module configured to transmit/receive a signal; an acoustic output means configured to output an acoustic; a microphone configured to acquire an acoustic; and a processor configured to control an operation of the acoustic output device, wherein the processor receives an audio output signal from an external audio replay device through the transmission/reception module, collects an external acoustic through the microphone and converts the external acoustic to an input signal, while an acoustic is output based on the audio output signal through the acoustic output means, and compares the audio output signal with the input signal to determine whether the user wears the acoustic output means.

In another embodiment, the acoustic output means may include a plurality of output units and the audio output signal may include a plurality of individual audio signals, the processor may individually convert the plurality of individual audio signals to the acoustics through the respective output units, and individually compare the plurality of individual audio signals with the input signal to determine whether the user wears each of the output units.

In another embodiment, the plurality of individual audio signals may include respective guide signals that are different signal patterns, and the processor may individually compare the guide signals with the input signal to determine whether the user wears each of the output units.

In another embodiment, the audio output signal may include a guide signal that is a preset signal pattern, and the processor may compare the guide signal with the input signal to determine whether the user wears the acoustic output means.

In another embodiment, the audio output signal may be distinguished into the guide signal that is a signal pattern preset for determining whether the acoustic output means is worn and a non-guide signal that is not the guide signal, and the processor may compare the guide signal and the input signal, when the guide signal is included in the audio output signal, and compare the audio output signal including the non-guide signal with the input signal, when the non-guide signal is included in the audio output signal to determine whether the user wears that acoustic output means.

In another embodiment, the processor may determine whether to add the guide signal to the audio output signal based on characteristics of the audio output signal.

In another embodiment, the acoustic output means may include a plurality of output units, the audio output signal may include a plurality of individual audio signals, and the processor may individually convert the plurality of individual audio signals to the acoustics through respective output units, and the processor may determine whether to add the guide signal based on a correlation between the individual audio signals.

In another embodiment, the processor may add the guide signal to the audio output signal, when the correlation between the individual audio signals is higher than a preset reference correlation, and exclude the guide signal from the audio output signal, when the correlation between the individual audio signals is lower than the preset reference correlation.

In another embodiment, the processor may calculate a detection result value representing how much the audio output signal is included in the input signal and determine that the user wears the acoustic output means, when the detection result value is equal to or greater than a preset detection limit value, and the detection limit value may be determined based on a combination of an energy of the audio output signal and an energy of an impulse response of an acoustic path between the acoustic output means and the microphone.

In accordance with another exemplary embodiment of the present disclosure, a method for controlling an audio signal processing device includes: controlling, by an acoustic output mean, an audio output signal to be output as an acoustic; acquiring an input signal to which an external acoustic collected through a microphone is converted during outputting of the acoustic; comparing the audio output signal and the input signal to determine whether a user wears the acoustic output means.

In another embodiment, the audio signal processing device may include the acoustic output means and the microphone.

Advantageous Effects

According to an embodiment of the present disclosure, whether an acoustic output means is worn may be efficiently determined.

According to an embodiment of the present disclosure, whether an acoustic output means is worn may be efficiently determined with a signal processing method without additional hardware.

In addition, according to another embodiment of the present disclosure, whether a user wears an acoustic output means may be determined, even though content is not being played.

In addition, according to another embodiment of the present disclosure, whether to be worn may be individually determined for a plurality of output units.

DETAILED DESCRIPTION OF EMBODIMENTS

Figure 1:
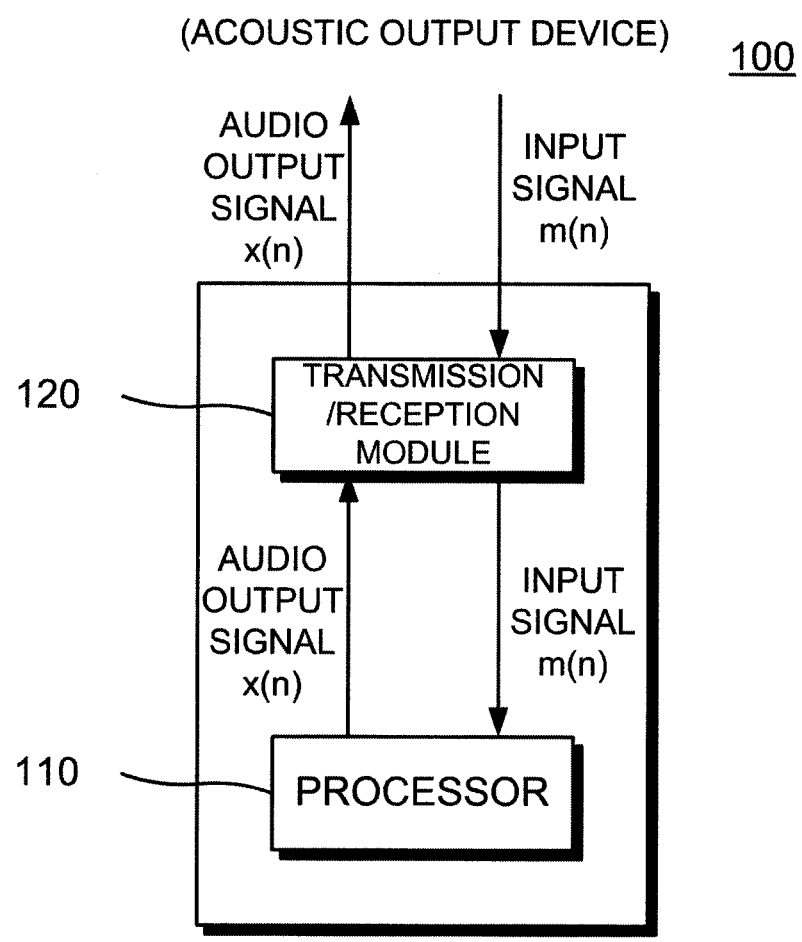
FIG. 1 is a view illustrating an audio signal processing device according to an embodiment of the present disclosure.

Hereinafter, embodiments of the present disclosure will be described in detail with reference to the accompanying drawings so that the present disclosure can be easily realized by those skilled in the art. The present disclosure can be practiced in various ways and is not limited to the embodiments described herein. In the drawings, parts which are not related to the description are omitted to clearly set forth the present disclosure and similar elements are denoted by similar reference symbols throughout the specification.

In addition, when an element is referred to as "comprising" or "including" a component, it does not preclude another component but may further include the other component unless the context clearly indicates otherwise.

This application claims the benefit of priority to Korean Patent Application No. 10-2015-0162125, the entire contents of which are incorporated herein by reference.

An audio signal processing device or an acoustic output device according to an embodiment of the present disclosure may analyze a signal received through a microphone without additional hardware to detect whether a user wears an acoustic output means. According to an embodiment of the present disclosure, an acoustic path, namely, a feedback path may be formed between the acoustic output means and the microphone. In addition, according to whether the user wears the acoustic output means, it may be determined how much an acoustic (sound) output through the acoustic output means is delivered to the microphone according to whether the user wears the acoustic output means. For example, when the user wears the acoustic output means in his/her ears, an acoustic (sound) output through the acoustic output means may be flowed into the ear canals of the user. Accordingly, an acoustic path, namely, the feedback path between the acoustic output means and microphone may be blocked. On the contrary, when the user does not wear the acoustic output means, at least a part of the acoustic output through the acoustic output means may be delivered to the microphone through the feedback path. An audio signal processing device or an acoustic output device according to an embodiment of the present disclosure may detect an acoustic delivered through the feedback path and determine whether the acoustic output means is worn on the basis of the detected result. In a scenario that the user enjoys multimedia content, a detected result whether the user wears the acoustic output means may be used in various applications and may be used for understanding an attitude of the user or context.

FIG. 1 is a view for illustrating an audio signal processing device according to an embodiment of the present disclosure.

According to FIG. 1, the audio signal processing device 100 may include a transmission/reception module 120 and a processor 110. The audio signal processing device 100 according to an embodiment of the present disclosure may be a personal digital assistant (PDA), a portable media displayer (PMP), a smartphone, a tablet, a phablet, a laptop, an mp3 player, or another portable audio replay device, but is not limited thereto, and may be a PC or another non-mobile audio replay device.

The transmission/reception module 120 may transmit/receive a wired or wireless signal to/from an external device. According to an embodiment of the present disclosure, the external device may be an external acoustic output device, and the wired or wireless signal may be an audio signal including acoustic content. The transmission/reception module 120 may include a wireless communication module, and transmit/receive the wireless signal through the wireless communication module. The wireless communication module may include a cellular communication module or a near field communication module such as a Wi-Fi communication module, Bluetooth communication module or Zigbee communication module. However, a type of the wireless communication module is not limited thereto, and a wireless communication module using other various wireless communication manners may be included in the transmission/reception module 120. The transmission/reception module 120 may include a wireless communication module according to a plurality of different communication manners. In addition, the transmission/reception module 120 may be paired with a plurality of external devices through the wireless communication module or transmit/receive a wireless signal to/from the plurality of external devices. Also, the transmission/reception module 120 may include a wired communication module, and transmit/receive the wired signal through the wired communication module. In particular, when the transmission/reception module 120 includes the wired communication module, the wired signal may be transmitted/received to/from an external device connected through a wire or a circuit. When including the wired communication module, the transmission/reception module 120 may include a terminal for connecting with the external device. According to an embodiment of the present disclosure, the terminal may be a 3.5 mm audio interface, a USB-C, or an Apple lightning interface, but is not limited thereto. The transmission/reception module 120 may include the wireless communication module and the wireless communication module together.

The processor 110 controls an overall operation of the audio signal processing device 100. The processor 110 may perform calculations and processes on various pieces of data and signals, and control each element of the audio signal processing device 100. The processor 110 may be realized in hardware in a type of a semiconductor chip or an electronic circuit, in software for controlling the hardware, or in a type that the hardware and the software are combined.

According to FIG. 1, the processor 110 may transmit an audio output signal x(n) to an external device through the transmission/reception module 120, and receive an input signal m(n) from the external device through the transmission/reception module 120. The processor 110 may perform a signal processing on the input signal m(n) and determine an operation manner of the audio signal processing device 100 on the basis of the signal processing result.

According to an embodiment of the present disclosure, the external device may be an external acoustic output device for outputting the audio output signal x(n) as an acoustic. The external acoustic output device may include a microphone and an acoustic output means. According to an embodiment of the present disclosure, the external acoustic output device may be an ear set, a headset or an earphone including a microphone, an earbud, or headphones, and the acoustic output means may be speaker units worn on the ears of the user, but is not limited thereto. The input signal m(n) may be converted from an external acoustic collected through the microphone, while the external acoustic output device outputs, through the acoustic output means, an acoustic based on the audio output signal. The processor 110 compares the audio output signal x(n) with the input signal m(n) and determines whether a user wears the external acoustic output device (or an acoustic output means of the external acoustic output device, for example, a speaker unit of an earphone).

On the other hand, according to an embodiment of the present disclosure, the acoustic output device may include a speaker unit for outputting an acoustic and may convert an electric signal to an acoustic that is air vibration through the speaker unit. At this point, the speaker unit may include an air-conduction (AC) speaker unit, a bone-conduction (BC) speaker unit, or both of the AC speaker unit and BC speaker unit. In addition, the microphone of the acoustic output device may be an AC microphone or a BC microphone according to a manner in which the present disclosure is embodied. Alternatively, the microphone may include both of the AC microphone and BC microphone.

Figure 2:
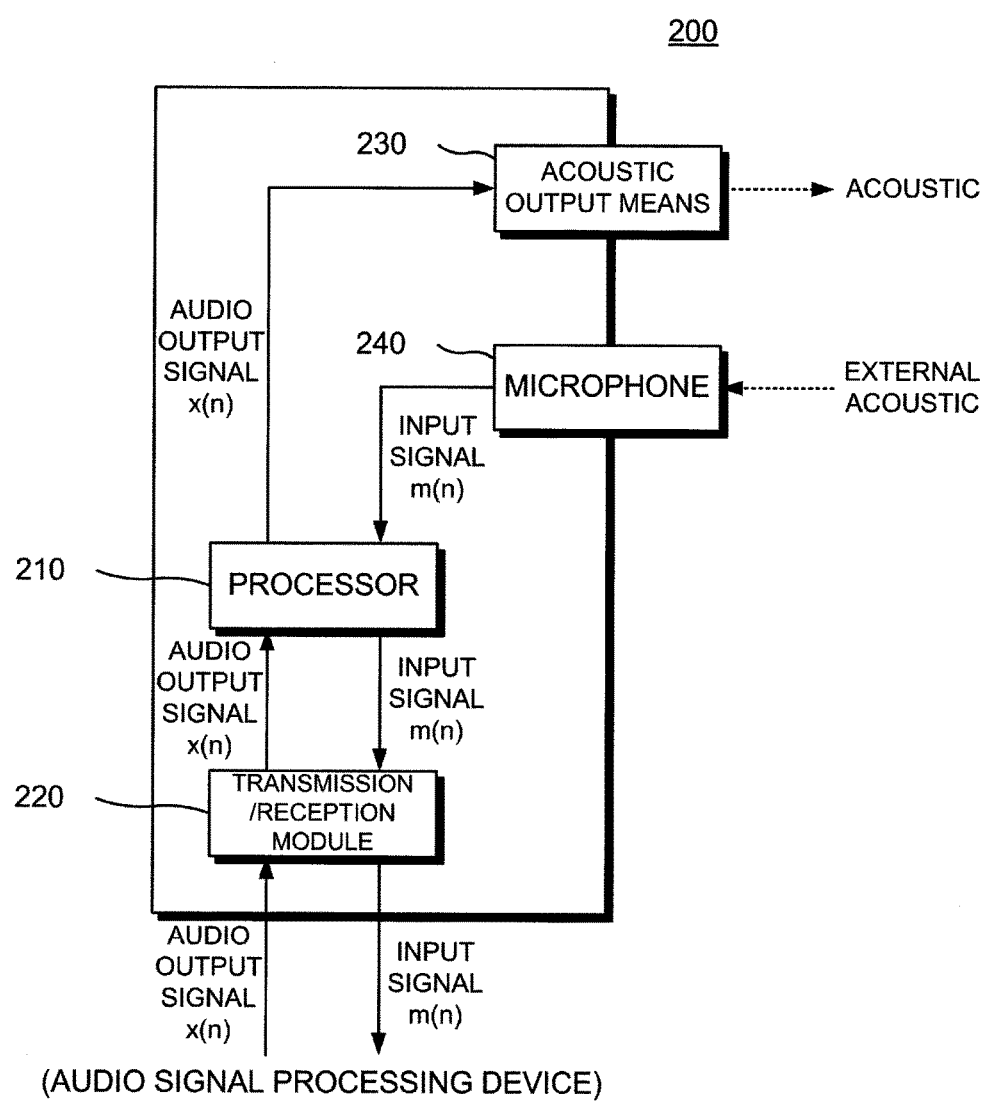
FIG. 2 is a view illustrating an acoustic output device according to an embodiment of the present disclosure.

FIG. 2 is a view illustrating an acoustic output device according to an embodiment of the present disclosure.

According to FIG. 2, the acoustic output device 200 may include a transmission/reception module 220, an acoustic output means 230, a microphone 240, and a processor 210. The acoustic output device 200 according to an embodiment of the present disclosure may be the foregoing ear set, headset or earphone including the microphone, earbud, or headphones, and the acoustic output means may be the speaker unit worn on the ears of the user, but are not respectively limited thereto.

The transmission/reception module 220 may transmit/receive a wired signal or wireless signal to/from an external device. According to an embodiment of the present disclosure, the external device may be an external audio replay device, and the wired or wireless signal may be an audio signal including acoustic content. The transmission/reception module 220 may include a wireless communication module, and transmit/receive the wireless signal through the wireless communication module. The wireless communication module may include a cellular communication module or a near field communication module such as a Wi-Fi communication module, Bluetooth communication module or Zigbee communication module. However, a type of the wireless communication module is not limited thereto, and a wireless communication module using other various wireless communication manners may be included in the transmission/reception module 220. The transmission/reception module 220 may include a wireless communication module according to a plurality of different communication manners. In addition, the transmission/reception module 220 may be paired with a plurality of external devices through the wireless communication module or transmit/receive a wireless signal to/from the plurality of external devices.

Also, the transmission/reception module 220 may include a wired communication module, and transmit/receive the wired signal through the wired communication module. In particular, when the transmission/reception module 220 includes the wired communication module, the wired signal may be transmitted/received to/from an external device connected through a wire or a circuit. When including the wired communication module, the transmission/reception module 220 may include a terminal for connecting with the external device. According to an embodiment of the present disclosure, the terminal may be a 3.5 mm audio interface, a USB-C, or an Apple lightning interface, but is not limited thereto. The transmission/reception module 220 may include the wireless communication module and wireless communication module together, The processor 210 controls an overall operation of the audio signal processing device 200. The processor 210 may perform calculations and processes on various pieces of data and signals, and control each element of the audio signal processing device 200. The processor 210 may be realized in hardware in a type of a semiconductor chip or an electronic circuit, in software for controlling the hardware, or in a type that the hardware and the software are combined.

The acoustic output means 230 outputs an acoustic. The acoustic output means 230 may convert an audio signal to an acoustic including acoustic content under a control of the processor 220. According to an embodiment of the present disclosure, the acoustic output means 230 may include a speaker unit for outputting an acoustic and may convert an electric signal to an acoustic that is air vibration through the speaker unit. At this point, the speaker unit may include an AC speaker unit, a BC speaker unit, or both of the AC speaker unit and BC speaker unit.

The microphone 240 acquires an acoustic. The microphone 240 may convert the acoustic to an electric signal under a control of the processor 220. The microphone 240 of FIG. 2 may be an AC microphone and the microphone 240 may be a BC microphone according to a manner in which the present disclosure is embodied. Alternatively, the microphone 240 of FIG. 2 may include both of the AC microphone and BC microphone.

According to FIG. 2, the processor 210 may receive, from an external device, an audio output signal x(n) through the transmission/audio module 220. In addition, the processor 210 may output an acoustic based on the audio output signal x(n) through the acoustic output means 230 and collect external acoustics through the microphone 240 to convert the collected acoustic to the input signal m(n), while the audio output signal x(n) is output through the acoustic output means 230. The processor 210 may perform a signal processing on the input signal m(n) and determine an operation manner of the audio signal processing device 200 on the basis of the signal processing result. Alternatively, the processor 210 may generate a control signal for controlling an operation of the external device on the basis of the signal processing result. The processor 210 may transmit, to the external device, the input signal m(n) or the control signal through the transmission/reception module 220.

According to an embodiment of the present disclosure, the external device may be an audio processing device or an external audio replay device for playing acoustic content, and may generate an audio output signal x(n) according to replay of acoustic content. The audio signal processing device or the audio replay device may be a PDA, a PMP, a smartphone, a tablet, a phablet, a laptop, an mp3 player, or another portable audio replay device, but is not limited thereto, and may be a PC or other non-mobile audio replay device. The processor 210 may compare the audio output signal x(n) with the input signal m(n) to determine whether the user wears the acoustic output means 230.

On the other hand, the audio output signal x(n) of FIGS. 1 and 2 may include a plurality of individual audio signals. According to an embodiment of the present disclosure, the audio output signal may be a multi-channel audio signal and each of the individual audio signals may be a signal corresponding to each channel signal. However, the present disclosure is not limited thereto. In addition, the acoustic output means of the external acoustic output device of FIG. 1 and the acoustic output means 230 of the acoustic output device 200 of FIG. 2 may include a plurality of output units. Here, according to an embodiment of the present disclosure, the output unit may correspond to the speaker unit and accordingly the plurality of output units may mean a plurality of speaker units. In addition, the respective individual audio signals may be converted to respective acoustics through the respective output units and in particular, the respective individual audio signals may be converted to respective acoustics through the different output units. According to an embodiment of the present disclosure, the audio output signal x(n) may include two channel signals and the acoustic output means may include two output units. Accordingly, each channel signal may be individually output through different output units.

As one example for determining whether the user is appreciating content, the following methods may be considered.

First, a situation may be assumed in which the acoustic output device is connected to a terminal (or an audio interface) of an audio replay device or in which the acoustic output device and the audio replay device are mutually connected wirelessly. According to an embodiment, when the acoustic output device is separated from the terminal or the wireless connection is cut off, the audio replay device may determine that the user does not appreciate the content. Accordingly, the audio replay device may stop the replay of content. However, in this case, it may not be simply concluded that the user is appreciating the content, even though the acoustic output device is connected to the audio replay device. On the other hand, the user usually appreciates acoustic content through various types of the acoustic output device (e.g. an ear set, earphones, earbuds, or a headset) and when appreciating acoustic content, the user wears the acoustic output device on his/her body (e.g. the ears). Accordingly, whether the user is currently appreciating the acoustic content may be determined on the basis of whether the user wears the acoustic output device.

A manner for detecting whether the user wears the acoustic output device may be provided in various ways. According to another embodiment, additional hardware may be included in the acoustic output device or the audio replay device, and a method may be considered which detects the distance between the acoustic output device and the user through the additional hardware. In this case, the hardware may be an independent proximity sensor such as an ambient light sensor. However, according to this manner, there are problems of non-compatibility of connecting an existing audio interface and an increase in manufacturing cost according to the additional hardware.

Hereinafter, a method will be described in which whether the user operates the acoustic output device is detected without additional hardware.

Figure 3A:
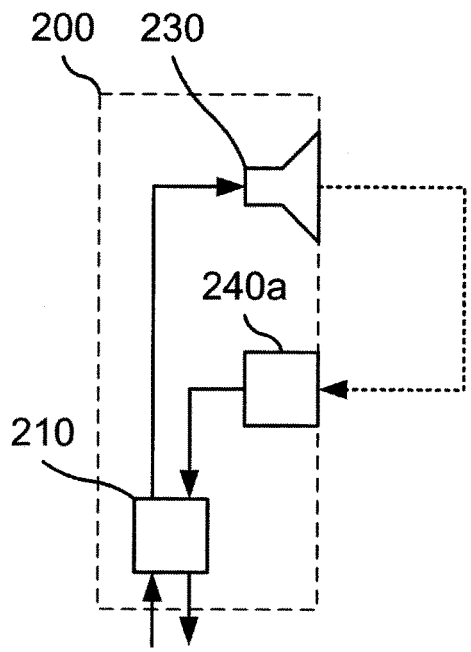
FIGS. 3A to 3D are a view illustrating a manner for determining whether a user wears an acoustic output means according to a type of the acoustic output means.
Figure 3B:
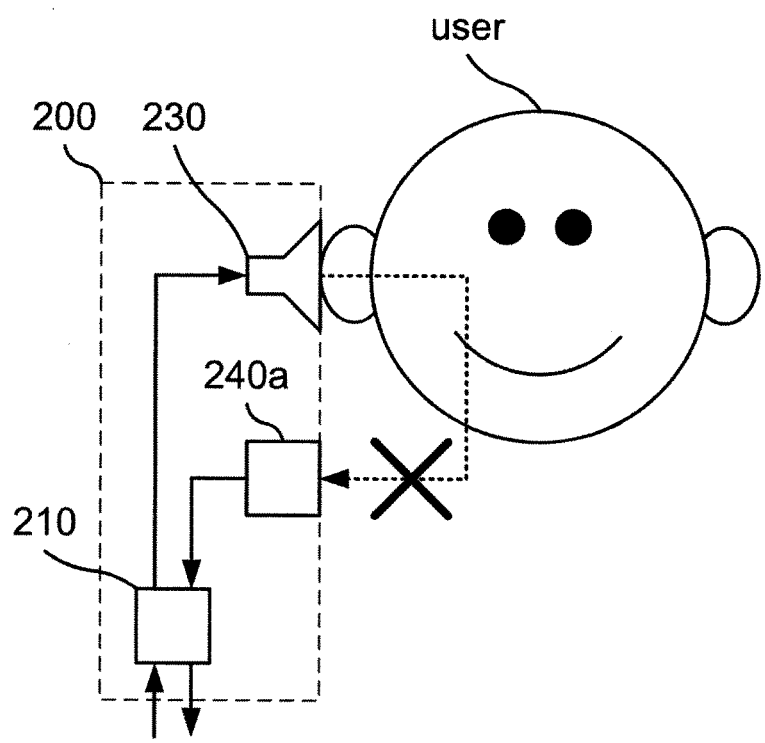

FIGS. 3A to 3D are a view illustrating a manner for determining whether a user wears an acoustic output means according to a type of the acoustic output means. The acoustic output device 200 according to an embodiment of the present disclosure may receive an audio output signal from an external device through the transmission/reception module 210 and may convert the audio output signal to an acoustic through the acoustic output means 230. In addition, while the acoustic output means 230 outputs acoustics, the acoustic output device 200 may acquire an external acoustic through microphones 230a and 230b, convert the acquired external acoustic to an input signal, and may transmit the input signal to an external device through the transmission/reception module 230. In FIGS. 3A and 3B, a dotted arrow indicates an acoustic path between the acoustic output means 230 and the microphones 240a and 240b, and a processor of the acoustic output device 200 is omitted.

FIGS. 3A and 3B illustrate that the acoustic output means 230 includes an AC speaker unit and the microphone 240a is an AC microphone.

The acoustic output device 200 of FIGS. 3A and 3B may be an existing AC earset, headset, earphone, earbud, or headphones. In other words, the acoustic output device 200 of FIGS. 3A and 3B may be a typical earset or headset for acoustic content appreciation, which is not specially produced for the present disclosure. According to FIG. 3A, an acoustic output through the acoustic output means 230 of the acoustic output device 200 may be acquired by the microphone 240a of the acoustic output device 200. At this point, it is assumed that there is the acoustic path between the acoustic output means 230 and the microphone 240a and the acoustic path may be called as a feedback path. As shown in FIGS. 3A and 3B, when the acoustic output means 230 includes the AC speaker unit and the microphone 240a is the AC microphone, the feedback path may be called as an AC path. In a state where the user does not wear the acoustic output means 230, as far as when the feedback path is not blocked by another object, at least a portion of the acoustic output from the acoustic output means 230 may be acquired by the microphone 240a (FIG. 3A). On the contrary, when the user wears the acoustic output means 230 (for example, when the user wears earphones in his/her ears), the feedback path is cut off by the user' body and accordingly, almost acoustic output through the acoustic output means 230 may be delivered to the user (for example, the acoustic is flowed into the ear canals of the user, FIG. 3B). Accordingly, the microphone 240a does not acquire acoustic output from the acoustic output means 230 or only acquires acoustic lower than a preset limit value (e.g. an ambient noise level). In other words, according to whether the user wears the acoustic output means 230, the acoustic collected by the microphone 240a may be differed. Consequently, the audio signal processing device or the acoustic output device according to the embodiment of the present disclosure may determine whether the user is wearing the acoustic output means 230 by comparing the acoustic output from the acoustic output means 230 with the acoustic acquired by the microphone 240a. The acoustic output by the acoustic output means 230 is an acoustic to which the audio output signal, which has been transmitted to the acoustic output means 230, is converted. In addition, while the acoustic output means 230 outputs the acoustic on the basis of the audio output signal, the acoustic acquired by the microphone 240a is collected through the microphone 240a and converted to an input signal by the microphone 240a. Accordingly, comparison between the acoustic output by the acoustic output means 230 and the acoustic acquired by the microphone 240a may be performed through comparison between the audio output signal and the input signal. According to an embodiment of the present disclosure, the audio signal processing device or the acoustic output device may calculate an output value when the input signal is applied to a matched filter based on the audio output signal, or a correlation between the audio output signal and the input signal. In addition, the audio signal processing device or the acoustic output device may determine that the user is not wearing the acoustic output means 230, when the correlation or the output value is greater than the preset limit value. However, the comparison manner of the present disclosure is not limited thereto.

The embodiment of the present disclosure may not be applied only to a case where the acoustic output means 230 and the microphone 240a are of the AC manner but to a case where the acoustic output means 230 and the microphone 240a of the BC manner.

Figure 3C:
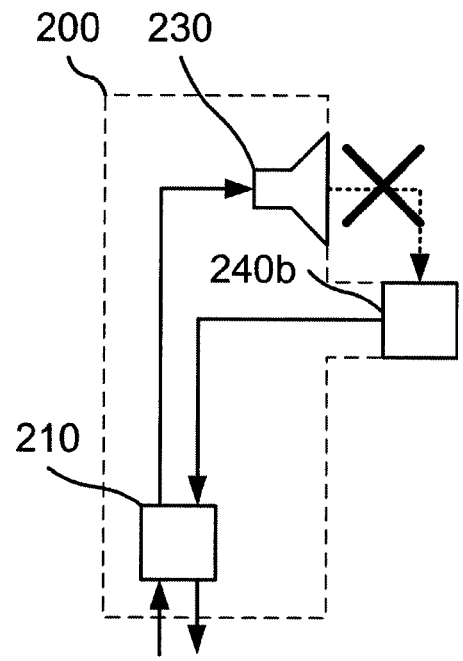
Figure 3D:
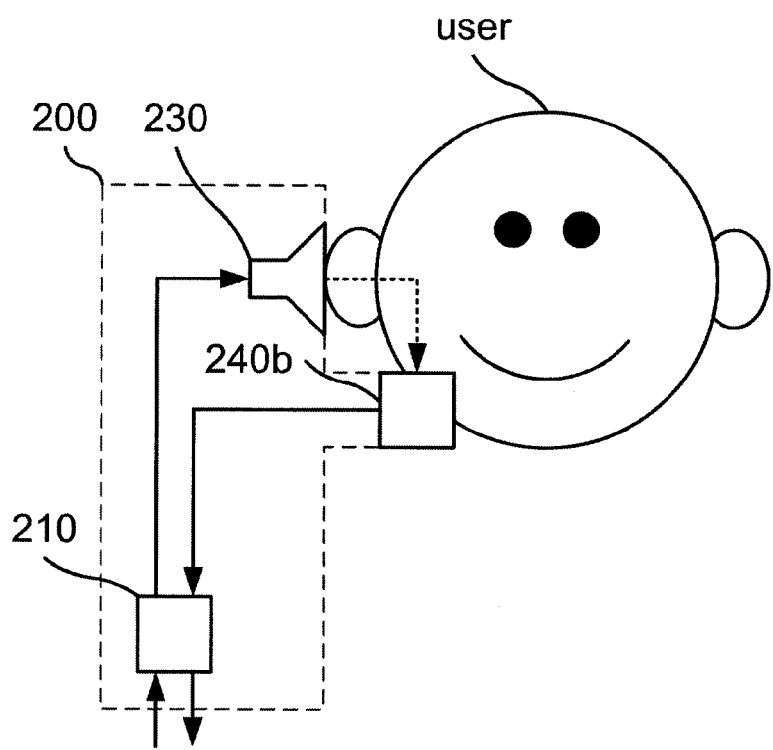

FIGS. 3C and 3D indicate a case where the acoustic output means 230 is an AC speaker unit or a BC speaker unit and the microphone 240b is a BC microphone. In FIGS. 3C and 3D, it may be assumed that an acoustic path (or a feedback path) exists between the acoustic output means 230 and the microphone 240b. However, unlike the cases of FIGS. 3A and 3B, in FIGS. 3C and 3D, the acoustic is delivered through a portion of the user's body. The acoustic path may be called as a BC path. When the user does not wear the acoustic output means 230, since the BC path is not formed, the microphone 240b does not acquire the acoustic output from the acoustic output means 230 or only acquires the acoustic of which level is lower than a preset limit value (e.g. an ambient noise level). On the contrary, when the user wears the acoustic output means 230, the BC path may be formed and accordingly at least a part of the acoustic output from the acoustic output means 230 may be acquired by the microphone 240b. In other words, also in FIGS. 3C and 3D, according to whether the user wears the acoustic output means 230, the acoustic collected by the microphone 240b may be differed. The comparison between the acoustic output by the acoustic output means 230 and the acoustic acquired by the microphone 240b may be performed through comparison between the audio output signal and the input signal. However, for FIGS. 3C and 3D, according to whether the user wears the acoustic output means 230, an aspect that the acoustic, which is output from the acoustic output means 230, is acquired is opposite to that of FIGS. 3A and 3B. Accordingly, for FIGS. 3C and 3D, when the acoustic output from the acoustic output means 230 is not acquired through the microphone 240b or an acquired amount of the acoustic is smaller than a specific limit value, the user may be determined not to wear the acoustic output means 230.

On the other hand, the microphone 240b of FIGS. 3C and 3D may acquire the acoustic through the BC path regardless of whether the output unit of the acoustic output means 230 is the AC speaker unit or BC speaker unit.

Hereinafter, it is assumed that the output unit of the acoustic output means is the AC speaker unit and the microphone is the AC microphone, but it is just an assumption for convenience of description, and the acoustic output device according to an embodiment of the present disclosure may include the BC speaker unit or the BC microphone unit.

Figure 4:
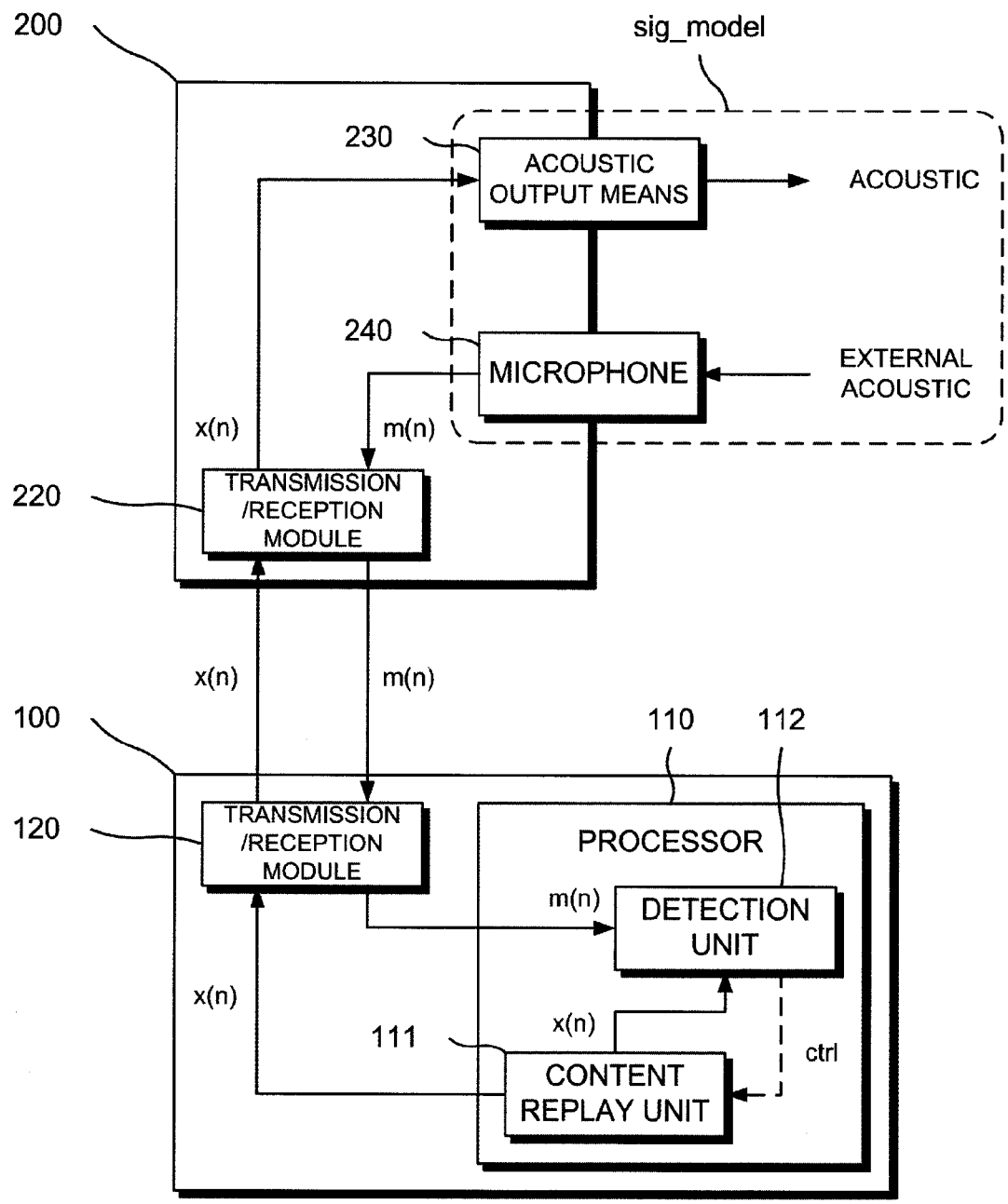
FIG. 4 is a view illustrating a manner for determining whether a user wears an acoustic output device according to an embodiment of the present disclosure.

FIG. 4 is a view illustrating a manner for determining whether a user wears an acoustic output means according to an embodiment of the present disclosure. According to FIG. 4, the audio signal processing device 100 and the acoustic output device 200 may transmit/receive an acoustic output signal x(n) or an input signal m(n) in a wired or wireless manner through the transmission/reception modules 120 and 220. At this point, the audio signal processing device 100 of FIG. 4 may be an audio signal processing device according to an embodiment of the present disclosure and the acoustic output device 200 may be an existing acoustic output device including a microphone. In this case, the audio signal processing device 100 may determine whether the user wears the acoustic output means 230. Alternatively, the audio signal processing device 100 of FIG. 4 may be a typical audio signal processing device and the acoustic output device 200 may be an acoustic output device according to an embodiment of the present disclosure. In this case, the acoustic output device 200 may determine whether the user wears the acoustic output means 230. Similarly to the cases of FIGS. 3A to 3D, a processor of the acoustic output device 200 is omitted in FIG. 4

Hereinafter, a description about a manner that the audio signal processing device 100 determines whether the user wears the acoustic output means 230 will be provided.

According to FIG. 4, the processor 110 of the audio signal processing device 100 may include a content replay unit 111 and a detection unit 112. The content replay unit 111 may output an audio output signal x(n). According to an embodiment of the present disclosure, the content replay unit 111 may convert, to an audio output signal x(n), content (acoustic content etc.) stored in a storage (not illustrated) of the audio signal processing device 100 or content received externally by the audio signal processing device 100, and transmit the converted audio output signal x(n) to the transmission/reception module 120 or the detection unit 112. The detection unit 112 may determine whether the signal received externally includes a detection target signal. A description will be provided below about a detailed operation manner of the detection unit 112.

According to FIG. 4, the content replay unit 111 of the processor 110 may transmit the audio output signal x(n) to the transmission/reception module 120, and the processor 110 may transmit the audio output signal x(n) to the transmission/reception module 220 of the acoustic output device 200 through the transmission/reception module 120 of the audio signal processing unit 100. The audio output signal x(n) having been received by the transmission/reception module 220 of the acoustic output device 200 may be transmitted to the acoustic output means 230 and the audio output signal x(n) may be output as an acoustic through the acoustic output means 230. While the acoustic output means 230 outputs an acoustic on the basis of the audio output signal x(n), the microphone 240 of the acoustic output device 200 may acquire an external acoustic and convert the acquired external acoustic to an input signal m(n). Here, according to whether the user wears the acoustic output means 230, it may be determined how much the external acoustic acquired by the microphone includes the acoustic output by the acoustic output device 200.

sig_model of FIG. 4 represents a signal model of the input signal m(n) on the basis of elements related to generation of the input signal m(n). The elements related to the generation of the input signal may include the acoustic output means 230 for converting the audio output signal x(n) to an acoustic, an acoustic path between the acoustic output means and the microphone 240, and the microphone 240. The input signal m(n) according to an embodiment of the present disclosure may be modeled based on an impulse response of each element related to the generation of the input signal.

Figure 5:
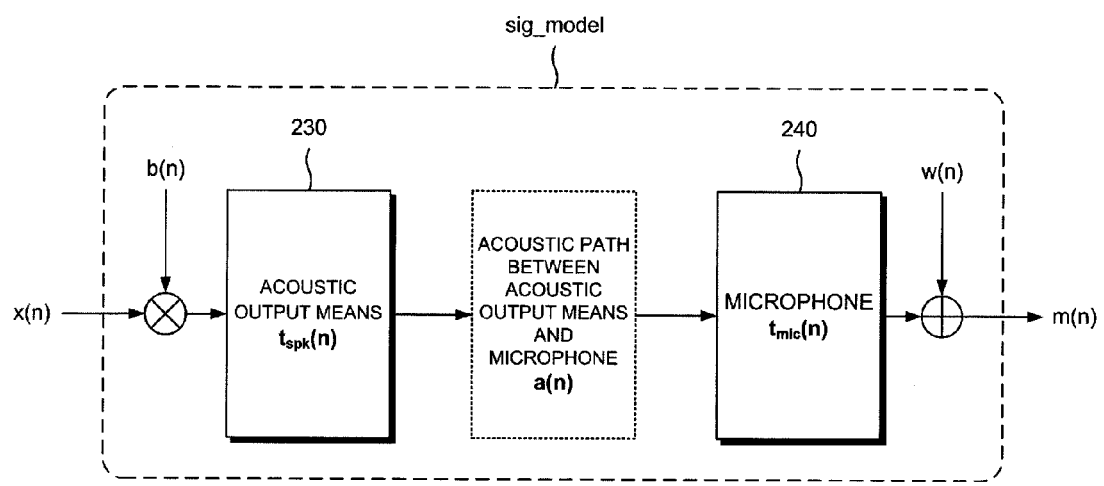
FIG. 5 is a view illustrating an input signal model according to an embodiment of the present disclosure.

FIG. 5 is a view illustrating an input signal model according to an embodiment of the present disclosure. In particular, FIG. 5 is a block diagram illustrating a process for deriving the input signal m(n) from a combination of the audio output signal x(n) and the respective impulse responses to the elements included in the input signal model sig_model of FIG. 4. In FIG. 5, $t_{spk}(n)$ denotes an impulse response of the acoustic output means, $t_{mic}(n)$ denotes an impulse response of the microphone, and $w(n)$ denotes an ambient noise that may be flowed in during the process for generating the input signal $m(n)$. $a(n)$ denotes an impulse response for the acoustic path between the acoustic output means and the microphone, and may include characteristics related to acoustic absorption (or attenuation) in the air or a room impulse response. $b(n)$ denotes a binary value indicating whether the acoustic output means is worn, and $b(n)=0$ indicates a state where the user wears the acoustic output means and $b(n)=1$ indicates a state where the user does not wear the acoustic output means. The following Equation (1) expresses an input signal according to the input signal model.

$$m(n)=b(n)(a(n)*t_{spk}(n)*t_{mic}(n)*x(n))+w(n) \quad \text{[Equation 1]}$$

In Equation (1), * denotes a convolution calculation. At this point, filtered $x(n)$ may be expressed as follows.

$$x_{filt}(n)=a(n)*t_{spk}(n)*t_{mic}(n)*x(n) \quad \text{[Equation 2]}$$

Accordingly, the input signal $m(n)$ may be arranged as follows.

$$m(n)=b(n)x_{filt}(n)+w(n) \quad \text{[Equation 3]}$$

Equation (3) may be identically applied to even a case where the acoustic output means of the acoustic output device includes an AC speaker unit or a BC speaker unit, and the microphone is a BC microphone, and the impulse response $a(n)$ may be replaced with an impulse response related to bone conduction of the acoustic.

On the other hand, the input signal $m(n)$ may have a signal model like Equation (3). However, when the audio signal processing device 100 or the acoustic output device 200 according to an embodiment of the present disclosure is realized, the input signal $m(n)$ may be replaced with a signal to which the acoustic actually acquired by the microphone 240 is converted. In addition, the audio signal processing device 100 or the acoustic output device 200 may perform post-processes using the input signal based on the actually acquired acoustic.

Back to FIG. 4, the input signal $m(n)$ generated through the process of FIG. 5 may be transmitted to the transmission/reception module 120 of the audio signal processing device 100 through the transmission/reception module 220 of the acoustic output device 200. The audio signal processing device 100 may transmit the received input signal $m(n)$ to the detection unit 112 of the processor 110. The detection unit 112 may compare the received input signal $m(n)$ with the audio output signal $x(n)$ received from the content replay unit 111 and determine whether the user wears the acoustic output means 230 on the basis of the compared result.

According to an embodiment of the present disclosure, the comparison may be to determine how much the input signal $m(n)$ includes the audio output signal $x(n)$. Alternatively, the comparison may be to determine how much the input signal $m(n)$ matches the audio output signal $x(n)$ or to determine a similarity between the two signals. Alternatively, the comparison may be to determine how much the acoustic based on the audio output signal $x(n)$ arrives at the microphone 240 through the acoustic path formed between the acoustic output means 230 and the microphone 240 to be converted to the input signal $m(n)$. In addition, according to an embodiment of the present disclosure, it may be calculated how much the input signal $m(n)$ includes the audio output signal $x(n)$ by using a matched filter or a correlator. Alternatively, according to an embodiment of the present disclosure, the detection unit 112 may calculate how much the audio output signal $x(n)$ matches the input signal $m(n)$. For the matched filter, a signal-to-noise ratio (SNR) between an output signal from the matched filter and an input noise may be optimized. When the matched filter is used, an impulse response $h(n)$ of the matched filter is required to satisfy the following condition.

$$H(\omega) = k \frac{X_{filt}(\omega)}{W(\omega)} e^{-j\omega t_d} \quad \text{[Equation 4]}$$

In Equation (4), $H(\omega)$ is a power spectrum of $h(n)$, $X_{filt}(\omega)$ is a power spectrum of $x_{filt}(n)$, and $W(\omega)$ is a power spectrum of $w(n)$. When it is assumed that an ambient noise input to the matched filter $h(n)$ is a Gaussian white noise process, $W(\omega)$ is close to 1. Therefore, the matched filter $h(n)$ may be expressed as $x_{filt}(n)$ reversed in a time domain in the following Equation (5).

$$h(n)=x_{filt}(N-1-n) \quad 0 \le n \le N-1 \quad \text{[Equation 5]}$$

Here, N means the frame length. Equation (5) may be more simply arranged. In other words, when $a(n)$ is assumed to be a white noise process, the acoustic path $a(n)$ may not cause spectral coloration, namely, a distortion of an energy distribution in a frequency domain of a signal. In addition, when the impulse response $t_{spk}(n)$ of the acoustic output means and the impulse response $t_{mic}(n)$ of the microphone are known, since the two impulse responses may be equalized, the two impulse responses $t_{spk}(n)$ and $t_{mic}(n)$ may be omitted. Consequently, the matched filter $h(n)$ may be estimated as follows.

$$h(n)=x(N-1-n) \quad 0 \le n \le N-1 \quad \text{[Equation 6]}$$

The detection unit 112 of the audio signal processing device 100 may obtain a filter output $z(n)$ by convoluting the matched filter $h(n)$ with the input signal $m(n)$ as the following Equation (7). Here, the filter output $z(n)$ may be a detection result value indicating how much the audio output signal $x(n)$ is included in the input signal $m(n)$. Alternatively, the filter output $z(n)$ may be a detection result value indicating how much the audio output signal $x(n)$ is detected from the input signal $m(n)$.

$$z(n) = \sum_{k=0}^{N-1} h(k)m(n-k) \quad \text{[Equation 7]}$$

According to an embodiment of the present disclosure, the detection unit 112 (or the processor 110) may calculate the detection result value indicating how much the audio output signal $x(n)$ is included in the input signal $m(n)$. At this point, when the detection result value $z(n)$ is equal to or greater than a preset detection limit value $thr(n)$, the detection unit 112 may determine that the user is wearing the acoustic output means 230, and when the detection result value $z(n)$ is smaller than the preset detection limit value $thr(n)$, the detection unit 112 may determine that the user is not wearing the acoustic output means 230. A manner of binary decision pf such a detection unit 112 may be expressed as the following Equation.

$$b'(n) = \begin{cases} 1 & \text{if } \text{abs}(z(n)) \ge thr(n) \\ 0 & \text{otherwise} \end{cases} \kappa \quad \text{[Equation 8]}$$

According to Equation (8), the detection result value z(n) may be compared with the detection limit value thr(n). Here, the detection limit value thr(n) may be a value indicating a detection sensitivity of the detection unit 112. In addition, b'(n) is a value for predicting the foregoing b(n) and indicates a result value generated by the detection unit 112. When b'(n) is 1, the detection unit 112 may determine that the user is wearing the acoustic output means 230 and when b'(n) is 0, the detection unit 112 may determine that the user is not wearing the acoustic output means 230.

The value of b'(n) may be changed according to the detection limit value thr(n). When the magnitude of the detection limit value thr(n) is small, even though the magnitude of z(n) is small (namely, when a slight audio output signal x(n) is detected from the input signal m(n)), b'(n) may have a value of 1. On the contrary, when the magnitude of the detection limit value thr(n) is large, even though the magnitude of z(n) is large (namely, when a large amount of audio output signal x(n) is detected from the input signal m(n)), b'(n) may have a value of 0. In the foregoing example, when z(n) is 0.3 and thr(n) is 0.4, b'(n) is 0, but thr(n) is smaller than 0.3, b'(n) is 1. Accordingly, in order that the detection unit 112 obtains an accurate value of b'(n), a proper detection limit value thr(n) is required to be selected.

According to an embodiment of the present disclosure, the detection limit value thr(n) may be determined based on a maximum value of the detection result value z(n). First, an energy of $x_{filt}(n)$, which is the filtered x(n), may be defined as $E_{xfilt}$. At this point, according to Equation (7), due to the characteristics of the matched filter, the detection result value z(n) may have a maximum value when n is N (i.e. a frame length), and the maximum value is $E_{filt}$. At this point, $E_{xfilt}$ may depend on the intensity of the audio output signal x(n) and frequency responses of a(n), $t_{spk}(n)$ and $t_{mic}(n)$. Here, it may be assumed that the frequency responses of a(n), $t_{spk}(n)$ and $t_{mic}(n)$ may have respective constant values for frequency bands (namely, the frequency responses are flat), and energies of impulse responses (or filters) a(n), $t_{spk}(n)$ and $t_{mic}(n)$ are respectively $E_a$, $E_{spk}$, and $E_{mic}$. When the user uses an identical acoustic output device, or the acoustic output means and the microphone of the acoustic output device are not replaced, $E_{spk}$ and $E_{mic}$ may be treated as constant values. On the other hand, $E_a$ may be determined by a relative position between the acoustic output means and the microphone. For example, $E_a$ of a case where the distance between the acoustic output means and the microphone is short may have a relatively larger value than $E_a$ of a case where the distance between the acoustic output means and the microphone is long. Accordingly, the detection limit value thr(n) may be derived as follows.

$$thr(n) = c \cdot \max(z(n)) = c \cdot E_a \cdot E_{spk} \cdot E_{mic} \cdot E_x = c' \cdot E_a \cdot E_x \quad \text{[Equation 9]}$$

In the Equation (9), $E_x$ denotes an energy of the audio output signal x(n) and c denotes a preset scale constant smaller than 1. According to the foregoing, since $E_{spk}$ and $E_{mic}$ may be treated as constants, c may be replaced with another constant c'.

According to Equation (9), the detection limit value thr(n) may be determined based on a combination of an energy $E_a$ of an impulse response for the acoustic path between the acoustic output means and the microphone and an energy $E_x$ of the audio output signal. Here, the audio output signal x(n), namely, $E_x$ is a known value, and $E_a$ may be determined based on a formfactor of the acoustic output device and the room impulse response. For example, a shape of the acoustic output device may be a value related to the length of a cable connecting between the speaker unit of the acoustic output means and the AC microphone. Such a shape of the acoustic output device may be treated as known information and may be replaced with a simple constant. The room impulse response used at the time of calculating $E_a$ may be a preset specific room impulse response. According to another embodiment of the present disclosure, the audio signal processing device 100 may determine a position of the audio signal processing device 100 and select a room impulse response corresponding to the position. For example, the audio signal processing device 100 may determine the position of the audio signal processing device 100 on the basis of GPS coordinates or a MAC address of a Wi-Fi access point. When the position of the audio signal processing device 100 is determined as a restroom, the audio signal processing device 100 may select a room impulse response corresponding to the restroom. At this point, the audio signal processing device 100 may calculate $E_a$ on the basis of the room impulse response of the restroom. However, a manner for calculating $E_a$ is not limited thereto. According to an embodiment, since the detection limit value thr(n) may be determined based on the foregoing $E_x$ and $E_a$, the detection unit 112 may determine more accurately whether the user wears the acoustic output means 230.

On the other hand, like a case where an external acoustic is collected through a BC microphone, it may be assumed that frequency responses of a(n), $t_{spk}(n)$ and $t_{mic}(n)$ do not respectively have constant values with respect to each frequency band. In this case, frequency characteristics of a(n), $t_{spk}(n)$ and $t_{mic}(n)$ may influence on $E_{xfilt}$. In order to reflect this, a frequency spectral analysis for the audio output signal x(n) may be used. For example, an impulse response may be defined which approximates $a(n)*t_{spk}(n)*t_{mic}(n)$. Accordingly, instead of treating $E_{spk}$ and $E_{mic}$ as constants in Equation (9), more accurate thr(n) may be calculated using f(n) on which a frequency characteristic of each filter is reflected. When E[·] represents an energy of ·, it may be arranged as $E[x(n)*f(n)]=E_{xfilt}$ and Equation (9) may be derived as follows.

$$thr(n) = k \cdot E_a \cdot E_{spk} \cdot E_{mic} \cdot E_x = k \cdot E_{xfilt} \quad \text{[Equation 10]}$$

In Equation (10), k may be a preset scale constant smaller than 1.

When the detection unit 112 determines that the user is wearing the acoustic output means 230 (b'(n)=0), the detection unit 112 may transmit, to the content replay unit 111, a control signal ctrl for starting or restarting replay of content. Alternatively, when the detection unit 112 determines that the user is not wearing the acoustic output means 230 (b'(n)=1), the detection unit 112 may transmit, to the content replay unit 111, a control signal ctrl for pausing or stopping replay of content. Besides, the detection unit 112 (or the processor 100) may control an operation of an external device or a content replay state in various ways on the basis of whether the user wears the acoustic output means 230.

In the foregoing embodiment, it has been described that the audio signal processing device 100 determines whether the user wears the acoustic output means 230. However, in an embodiment of the present disclosure, the acoustic output device 200 may also determine whether the user wears the acoustic output means 230.

The processor (not illustrated) of the acoustic output device 200 of FIG. 4 may receive the audio output signal x(n) from the audio signal processing device 100 through the transmission/reception module 220. In addition, the processor of the acoustic output device 200 may generate the input signal m(n) by collecting an external acoustic through the microphone 240, while outputting an acoustic based on the audio output signal x(n) through the acoustic output means 230. Here, since the relation between the audio output signal x(n) and the input signal m(n) has been described in relation to FIG. 5, it will be omitted. The processor of the acoustic output device 200 may also include the detection unit (not illustrated). The detection unit of the acoustic output device 200 may compare the audio output signal x(n) with the input signal m(n) to determine whether the user wears the acoustic output means 230.

At this point, the detection unit of the acoustic output device 200 calculates the detection result value z(n) that represents how much the audio output signal x(n) is included in the input signal m(n) and when the detection result value z(n) is equal to or greater than a preset detection limit value thr(n), the user may be determined to wear the acoustic output means 230. Here, the detection limit value thr(n) may be determined based on a maximum value of the detection result value z(n). In addition, the detection limit value thr(n) may be determined based on a combination of the impulse response energy for the acoustic path between the acoustic output means and the microphone, and the energy of the audio output signal. A detailed description about a comparison manner of x(n) and m(n) of the detection unit of the acoustic output device 200, and detailed descriptions about b(n), b'(n) and thr(n) related to the comparison will be omitted.

When the detection unit of the acoustic output device 200 determines that the user is wearing the acoustic output means 230 (b'(n)=0), the detection unit of the acoustic output device 200 may transmit a control signal ctrl for requesting to start or restart replay of content to the audio signal processing device 100 or an external audio replay device. In addition, when the detection unit of the acoustic output device 200 determines that the user is not wearing the acoustic output means 230 (b'(n)=1), the detection unit of the acoustic output device 200 may transmit a control signal ctrl for requesting to pause or stop replay of content to the audio signal processing device 100 or an external audio replay device. Besides, the detection unit (or the processor) may control an operation of an external device or a content replay state in various ways on the basis of whether the user wears the acoustic output means 230.

Figure 6:
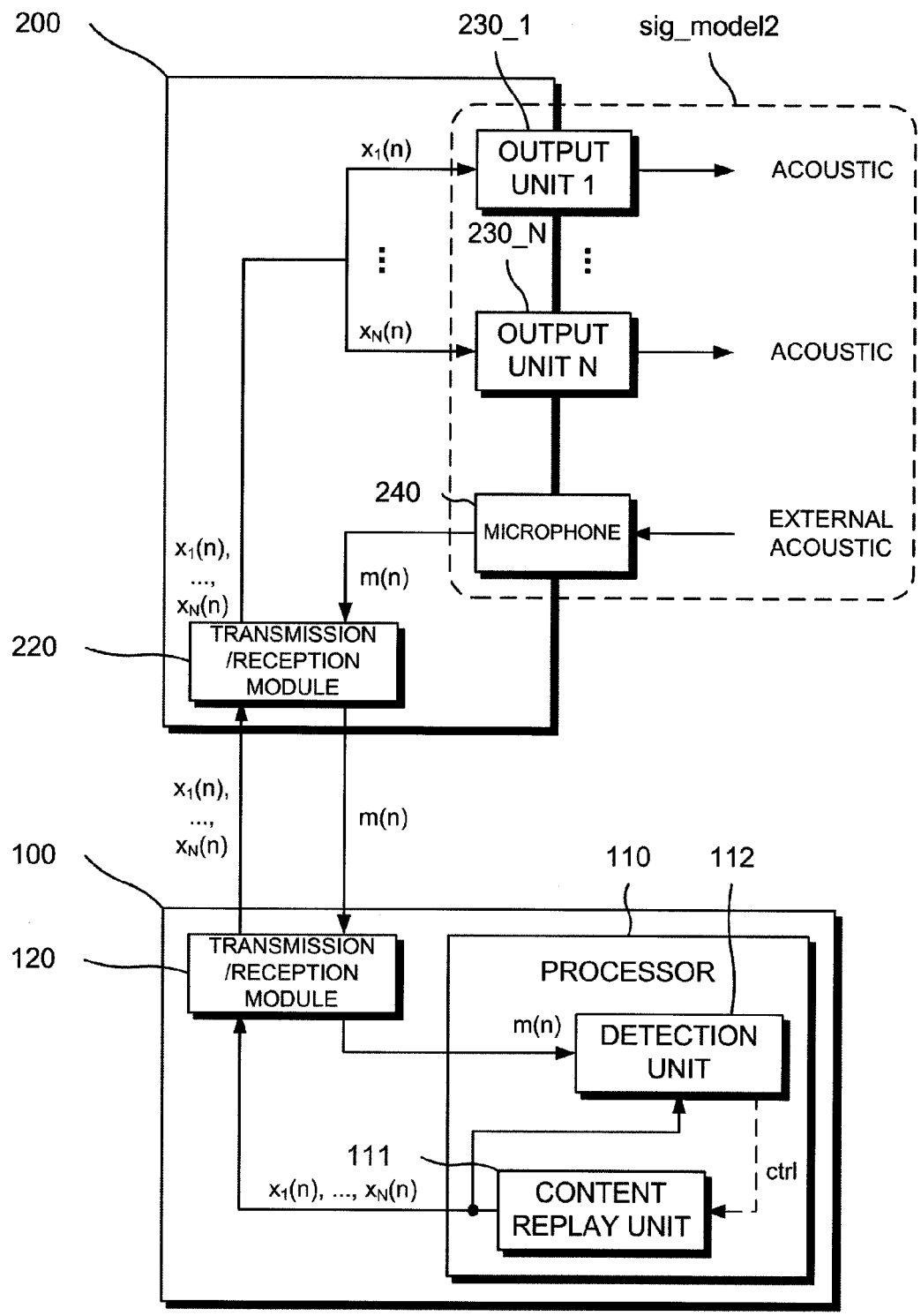
FIG. 6 is a view illustrating a manner for determining whether a user wears an acoustic output device according to another embodiment of the present disclosure.
Figure 7:
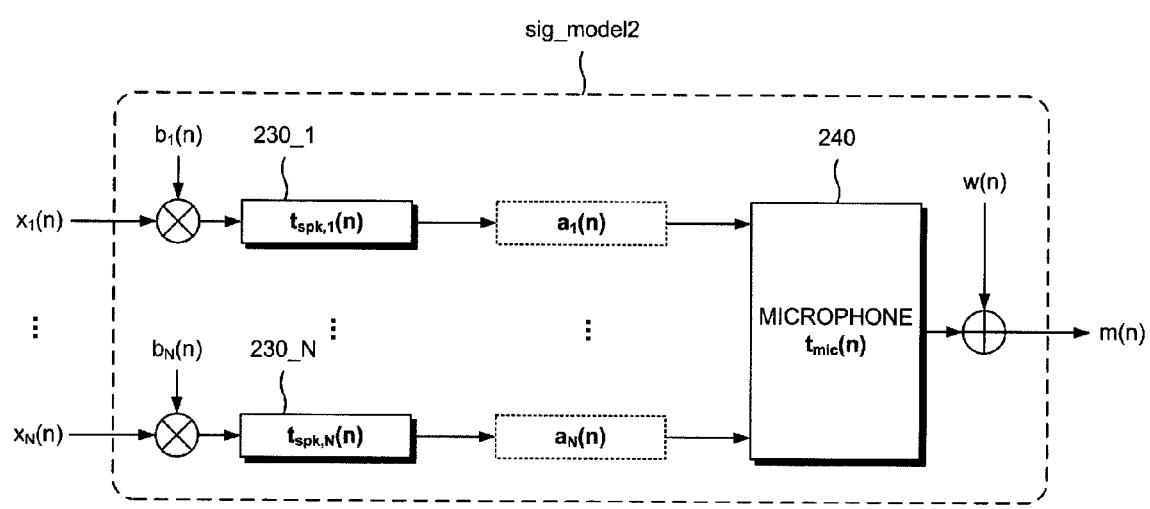
FIG. 7 is a view illustrating an input signal model according to another embodiment of the present disclosure.

FIG. 6 is a view illustrating a manner for determining whether a user wears an acoustic output means according to another embodiment of the present disclosure. In addition, FIG. 7 is a view illustrating an input signal model sig_model2 according to another embodiment of the present disclosure, which is a block diagram representing a relation between a plurality of individual audio signals $x_1(n)$ to $x_N(n)$ and the input signal m(n).

According to FIG. 6, the acoustic output means includes a plurality of output units, the audio output signal includes a plurality of individual audio signals, the plurality of individual audio signals may be individually converted to the acoustic by the respective output units, and the processor may individually compare the plurality of individual audio signals with the input signal to determine whether the user wears each of the output units. A detailed description will be provided as follows.

According to FIG. 6, the audio signal processing device 100 and the acoustic output device 200 may transmit/receive acoustic output signals (or individual audio signals) $x_1(n)$ to $x_N(n)$, or an input signal m(n) in a wired or wireless manner through the transmission/reception modules 120 and 220. At this point, the audio signal processing device 100 of FIG. 6 may be an audio signal processing device according to an embodiment of the present disclosure and the acoustic output device 200 may be an existing acoustic output device including a microphone. In this case, the audio signal processing device 100 may determine whether the user wears the acoustic output means 230_1 to 230_N. Alternatively, the audio signal processing device 100 of FIG. 6 may be a typical audio signal processing device and the acoustic output device 200 may be an acoustic output device according to an embodiment of the present disclosure. In this case, the acoustic output device 200 may determine whether the user wears the acoustic output means 230_1 to 230_N. Similarly to the cases of FIGS. 3A to 3D, a processor of the acoustic output device 200 is omitted in FIG. 6

According to an embodiment of the present disclosure, the audio output signal may include the plurality of individual audio signals $x_1(n)$ to $x_N(n)$, where N is a natural number of 2 or greater. For example, the audio output signal may be a multi-channel audio signal and the respective individual audio signals $x_1(n)$ to $x_N(n)$ may correspond to respective channel signals. On the other hand, the acoustic output means of the acoustic output device 200 may include the plurality of output units 230_1 to 230_N and the output unit may correspond to the foregoing speaker unit. Accordingly, the plurality of output units may mean a plurality of speaker units. The respective individual audio signals $x_1(n)$ to $x_N(n)$ may be converted to acoustics through the respective output units. In particular, the respective individual audio signals $x_1(n)$ to $x_N(n)$ may be respectively converted to the acoustics through the different output units.

In FIG. 6, the numbers of the individual audio signals and the output units are equal as N, but the present disclosure is not limited thereto, and the numbers of the individual audio signals and the output units may be different. When the numbers of the individual audio signals and the output units are different, each of the individual audio signals may be output through a preset output unit, or the audio signal processing device 100 or the acoustic output device 200 may separately select an output unit for converting the individual audio signals to the acoustic. In particular, when the number of the individual audio signals is greater than the number of the output units, the individual audio signals may be converted, through a separate mixing process, to mixed audio signals of which a number is smaller, and then delivered to the output units.

When the acoustic output means includes the plurality of output units 230_1 to 230_N and the audio output signal includes the plurality of individual audio signals $x_1(n)$ to $x_N(n)$, the audio signal processing device 100 or the acoustic output device 200 according to an embodiment of the present disclosure may individually compare the plurality of individual audio signals $x_1(n)$ to $x_N(n)$ with the input signal m(n). In addition, the audio signal processing device 100 or the acoustic output device 200 may determine whether the user wears each of the output units 230_1 to 230_N on the basis of the compared result.

According to an embodiment of the present disclosure, the audio output signal may include two individual audio signals $x_L(n)$ and $x_R(n)$ and the acoustic output means may include two output units—a left output unit 230_L (not illustrated) and a right output unit 230_R (not illustrated). Accordingly, the individual audio signal $x_L(n)$ may be converted to an acoustic through the left output unit 230_L and the individual audio signal $x_R(n)$ may be converted to an acoustic through the right output unit 230_R. It is assumed that each of the numbers of the individual audio signals and the output units is two in a description below. According to an embodiment of the present disclosure, the $x_L(n)$ and $x_R(n)$ may respectively correspond to channel signals of a stereo audio signal. In this case, the $x_L(n)$ and $x_R(n)$ that are respective channel signals of the stereo audio signal are typically different audio signals. However, the present disclosure is not limited thereto, and the $x_L(n)$ and $x_R(n)$ may be identical according to content including the stereo audio signal.

When the audio output signal includes two individual audio signals $x_L(n)$ and $x_R(n)$, each of the individual signals may be distinguished into $x_{UL}(n)$ and $x_{UR}(n)$ that are correlated components, and $x_{UL}(n)$ and $x_{UR}(n)$ that are uncorrelated components as the following Equation (11).

$$x_L(n) = x_{CL}(n) + x_{UL}(n)$$

$$x_R(n) = x_{CR}(n) + x_{UR}(n) \quad \text{[Equation 11]}$$

In Equation (11), $x_{UL}(n)$ and $x_{RL}(n)$ are fully uncorrelated. In this case, the input signal m(n) may be arranged as follows.

$$m(n) = b_L(n)\{t_{spk}(n) * t_{mic}(n) * a_L(n) * x_L(n)\} + \quad \text{[Equation 12]}$$
$$b_R(n)\{t_{spk}(n) * t_{mic}(n) * a_R(n) * x_R(n)\} + w(n)$$
$$= b_L(n)x_{filt,L}(n) + b_R(n)x_{filt,R}(n) + w(n)$$
$$\text{where } x_{filt,L}(n) = t_{spk}(n) * t_{mic}(n) * a_L(n) * x_L(n) \text{ and}$$
$$x_{filt,R}(n) = t_{spk}(n) * t_{mic}(n) * a_R(n) * x_R(n)$$

In Equation (12), a difference between impulse responses of the output units is neglected and assumed to have an identical impulse response $t_{spk}(n)$. In addition, in Equation (12), $a_L(n)$ denotes an impulse response of the acoustic path between the left output unit 230_L and the microphone 240, which corresponds to the individual audio signal $x_L(n)$ and $a_R(n)$ denotes an impulse response of the acoustic path between the right output unit 230_R and the microphone 240, which corresponds to the individual audio signal $x_R(n)$. In Equation (12), $b_L(n)$ is a binary value indicating whether the user wears the left output unit 230_L corresponding to the individual audio signal $x_L(n)$ and $b_R(n)$ is a binary value indicating whether the user wears the right output unit 230_R corresponding to the individual audio signal $x_R(n)$. $b_L(n)=0$ indicates a state where the user wears the left output unit, and $b_L(n)=1$ indicates a state where the user does not wear the left output unit. $b_R(n)=0$ indicates a state where the user wears the right output unit, and $b_R(n)=1$ indicates a state where the user does not wear the right output unit. $x_{filtL}(n)$ indicates filtered $x_L(n)$ and $x_{filtR}(n)$ indicates filtered $x_R(n)$. Equation (12) indicates a situation where N=2, $x_1(n)=x_L(n)$, $x_2(n)=x_R(n)$, and $t_{spk,1}(n)=t_{spk,2}(n)=t_{spk}(n)$ in the block diagram of FIG. 7.

Since the individual audio signals exists in plurality and the output units exists in plurality, the matched filters for determining whether each output unit is worn are also provided in plurality. Equation of the matched filter for determining whether each output unit is worn is as follows.

$$h_L(n) = x_{filt,L}(N-1-n) \quad 0 \le n \le N-1$$

$$h_R(n) = x_{filt,R}(N-1-n) \quad 0 \le n \le N-1 \quad \text{[Equation 13]}$$

The two matched filters $h_R(n)$ and $h_L(n)$ may be generated based on the individual audio signals $x_L(n)$ and $x_R(n)$, and the processor (or the detection unit) of the audio signal processing device 100 or the acoustic output device 200 may individually determine whether the user wears each output unit by using the two matched filters. When the individual audio signals $x_L(n)$ and $x_R(n)$ are different from each other, the two matched filters $h_R(n)$ and $h_L(n)$ based on the different individual audio signals may also be generated differently from each other. In other words, when the cross-correlation between $x_L(n)$ and $x_R(n)$ is lower, whether the user wears each output unit may be more easily determined.

When Equation 11 is applied to Equation 12, the following Equation may be derived.

$$m(n) = b_L(n)\{t_{spk}(n) * t_{mic}(n) * a_L(n) * (x_{CL}(n) + \quad \text{[Equation 14]}$$
$$x_{UL}(n))\} + b_R(n)\{t_{spk}(n) * t_{mic}(n) * a_R(n) *$$
$$(x_{CR}(n) + x_{UR}(n))\} + w(n)$$
$$= b_L(n)t_{spk}(n) * t_{mic}(n) * a_L(n) * x_{CL}(n) +$$
$$b_R(n)t_{spk}(n) * t_{mic}(n) * a_R(n) * x_{CR}(n) +$$
$$b_L(n)t_{spk}(n) * t_{mic}(n) * a_L(n) * x_{UL}(n) +$$
$$b_R(n)t_{spk}(n) * t_{mic}(n) * a_R(n) * x_{UR}(n) + w(n)$$

When the correlation between $x_L(n)$ and $x_R(n)$ is very low or does not exist, since $x_{CL}(n)$ and $x_{CR}(n)$ are close to 0, the audio signal processing device 100 or the acoustic output device 200 may determine very easily whether the user wears each output unit.

The detection result value and the detection limit value using each matched filter may be derived as follows.

$$z_i(n) = \sum_{k=0}^{N-1} h_i(k)m(n-k) \quad \text{[Equation 15]}$$
$$thr_i(n) = k \cdot E_{a,i} \cdot E_{spk,i} \cdot E_{mic} \cdot E_{x,i}$$
$$= k \cdot E_{xfilt,i}$$
$$\text{where } i = \{L, R\}$$

According to an embodiment of the present disclosure, the respective detection limit values $thr_L(n)$ and $thr_R(n)$ may be determined based on maximum values of the respective detection result values $z_L(n)$ and $z_R(n)$. In Equation (15), $E_{a,L}$ and $E_{a,R}$ mean energies of respective impulse responses $a_L(n)$ and $a_R(n)$. $E_{spk,L}$ and $E_{spk,R}$ mean respective impulse response energies of the left and right output units and as the foregoing, when it is assumed that the impulse responses of the two output units are same, it may be that $E_{spk,L}=E_{spk,R}=E_{spk}$. $E_{xfiltL}$ and $E_{xfiltR}$ mean respective energies of the filtered individual audio signals $x_L(n)$ and $x_R(n)$.

When the detection result value $z_L(n)$ is equal to or greater than $thr_L(n)$, the audio signal processing device 100 or the acoustic output device 200 may calculate that the value of $b'_L(n)$ is 1 and through this, determine that the user does not wear the left output unit. When the detection result value $z_L(n)$ is smaller than $thr_L(n)$, the audio signal processing device 100 or the acoustic output device 200 may calculate that the value of $b'_L(n)$ is 0 and through this, determine that the user wears the left output unit.

When the detection result value $z_R(n)$ is equal to or greater than $thr_R(n)$, the audio signal processing device 100 or the acoustic output device 200 may calculate that the value of $b'_R(n)$ is 1. Through this, the audio signal processing device 100 may determine that the user does not wear the right output unit. When the detection result value $z_R(n)$ is smaller than $thr_R(n)$, the audio signal processing device 100 or the acoustic output device 200 may calculate that the value of $b'_R(n)$ is 0. Through this, the audio signal processing device 100 may determine that the user wears the right output unit. The above description may be arranged as the following Table 1.

TABLE 1

| Relation between detection result value (z) and detection limit value (thr) | Output unit wearing state | |
|---|---|---|
| | Left | Right |
| $z_L(n) < thr_L(n)$ & $z_R(n) < thr_R(n)$ | ○ | ○ |
| $z_L(n) < thr_L(n)$ & $z_R(n) > thr_R(n)$ | ○ | X |
| $z_L(n) > thr_L(n)$ & $z_R(n) < thr_R(n)$ | X | ○ |
| $z_L(n) > thr_L(n)$ & $z_R(n) > thr_R(n)$ | X | X |

On the other hand, in the case that the microphone 230 according to an embodiment of the present disclosure is a BC microphone, the user is determined to wear the acoustic output means when $b'(n)$ is 1 and the user is determined not to wear the acoustic output means when $b'(n)$ is 0. Therefore, when the microphone 230 is the BC microphone, Table 1 may be changed as the following Table 2.

TABLE 2

| Relation between detection result value (z) and detection limit value (thr) (BC case) | Output unit wearing state | |
|---|---|---|
| | Left | Right |
| $z_L(n) > thr_L(n)$ & $z_R(n) > thr_R(n)$ | ○ | ○ |
| $z_L(n) > thr_L(n)$ & $z_R(n) < thr_R(n)$ | ○ | X |
| $z_L(n) < thr_L(n)$ & $z_R(n) > thr_R(n)$ | X | ○ |
| $z_L(n) < thr_L(n)$ & $z_R(n) < thr_R(n)$ | X | X |

According to the foregoing description, whether the user wears the acoustic output means or the output unit may be determined based on whether the detection result value is equal to or greater than the detection limit value. At this point, the determined result may be different according to the magnitude of a volume at the time of playing the audio output signal, which is a detection target. For example, even though the user wears the acoustic output means or the output unit, when the volume of the audio output signal is very large, an acoustic to which the audio output signal is converted may leak from the acoustic output means or the output unit (accordingly, an unwanted acoustic path may be formed). When the leaking acoustic is acquired by the microphone, the audio signal processing device or the acoustic output device may determine that the user does not wear the acoustic output means or the output unit.

Accordingly, it is necessary that the foregoing equations include a variable related to the volume of the audio output signal. The audio output signal $x(n)$ according to an embodiment of the present disclosure may be defined as the following Equation (16).

$$x(n) = v \cdot s(n) \quad \text{[Equation 16]}$$

In Equation (16), $s(n)$ denotes an un-processed, digital signal and v is a gain value indicating a volume. $s(n)$ may be an original source signal such as PCM data, and may be a signal stored in a storage of the audio signal processing device or received externally by the audio signal processing device. When the audio output signal $x(n)$ according to Equation (16) is applied to each Equation, the detection limit value $thr(n)$ may be derived as follows.

$$thr(n) = k \cdot E_a \cdot E_s \cdot v \quad \text{[Equation 17]}$$

In Equation (17), k denotes a constant value, and $E_s$ means an energy of $s(n)$.

On the other hand, whether the user wears each output unit may be determined by the audio signal processing device 100 or the acoustic output device 200 according to an embodiment of the present disclosure. In addition, the audio signal processing device 100 or the acoustic output device 200 may perform an additional process such as a control for an external device or a change of content replay state on the basis of whether the user wears each output unit.

According to FIGS. 4 to 7, the audio sign processing device 100 or the acoustic output device 200 does not use an additional signal for determining whether the user wears the acoustic output means (output unit). Accordingly, an operation manner of the audio signal processing device 100 or the acoustic output device 200 according to FIGS. 4 to 7 may be called as non-guide detection. Alternatively, FIGS. 4 to 7 represent embodiments in which the audio signal processing device 100 or the acoustic output device 200 operates in a non-guide mode.

Figure 8:
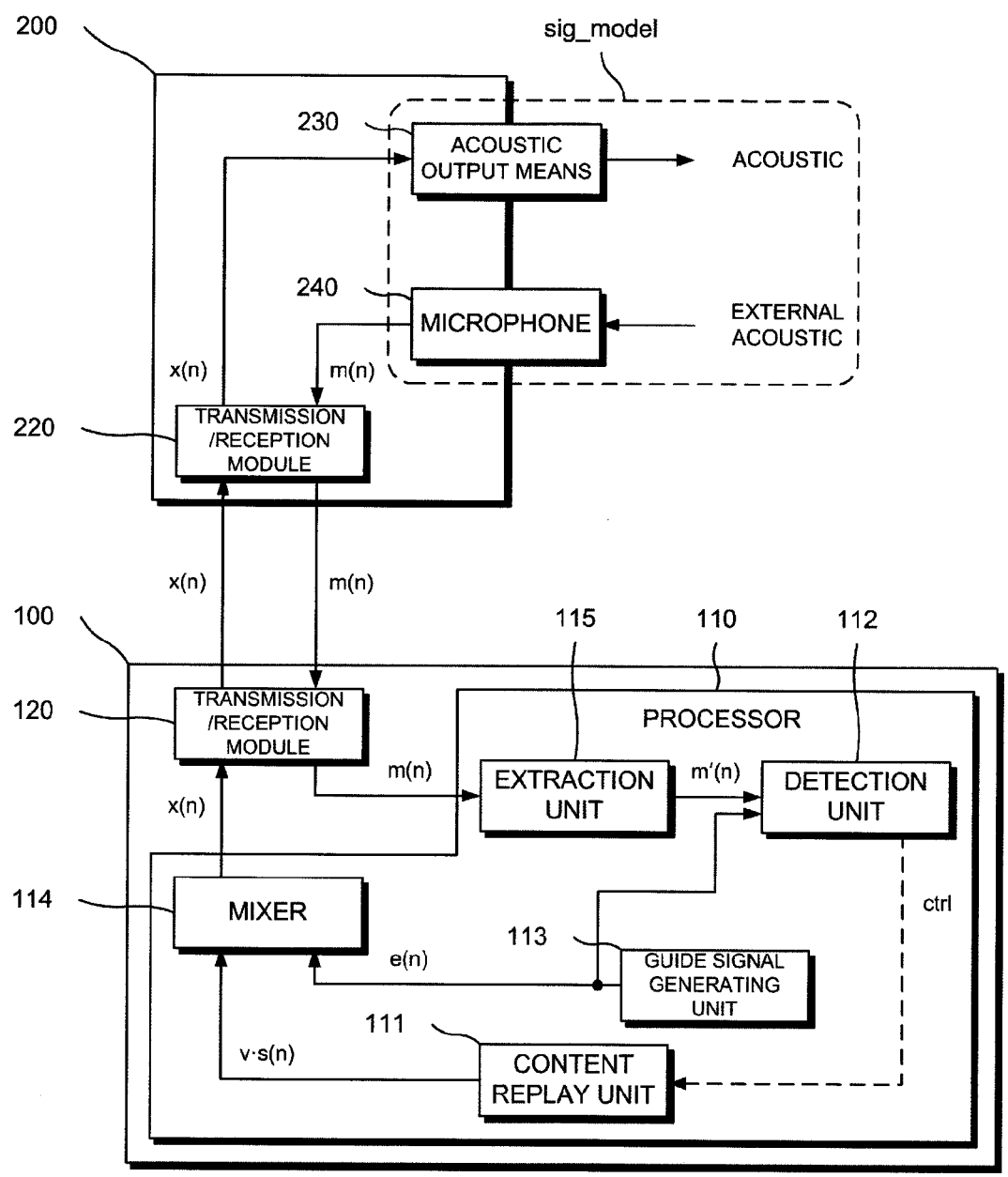
FIG. 8 is a view illustrating a manner for determining whether a user wears an acoustic output device by using a guide signal.

FIG. 8 is a view illustrating a manner for determining whether a user wears an acoustic output means by using a guide signal.

An audio signal processing device or an acoustic output device of FIGS. 8 to 11 may determine whether the user wears the acoustic output means using a guide signal. Accordingly, an operation manner of the audio signal processing device or the acoustic output device according to FIGS. 8 to 11 may be called as guide detection. Alternatively, FIGS. 8 to 11 represent embodiments in which the audio signal processing device or the acoustic output device operates in a guide mode.

According to FIG. 8, the audio signal processing device 100 and the acoustic output device 200 may transmit/receive an acoustic output signal $x(n)$ or an input signal $m(n)$ in a wired or wireless manner through the transmission/reception modules 120 and 220. At this point, the audio signal processing device 100 of FIG. 8 may be an audio signal processing device according to an embodiment of the present disclosure and the acoustic output device 200 may be an existing acoustic output device including a microphone. In this case, the audio signal processing device 100 may determine whether the user wears the acoustic output means 230. Alternatively, the audio signal processing device 100 of FIG. 8 may be a typical audio signal processing device and the acoustic output device 200 may be an acoustic output device according to an embodiment of the present disclosure. In this case, the acoustic output device 200 may determine whether the user wears the acoustic output means 230. Similarly to the case of FIG. 4, a processor of the acoustic output device 200 is omitted in FIG. 8.

Hereinafter, a description about a manner that the audio signal processing device 100 determines whether the user wears the acoustic output means 230 by using a guide signal will be provided.

Figure 9:
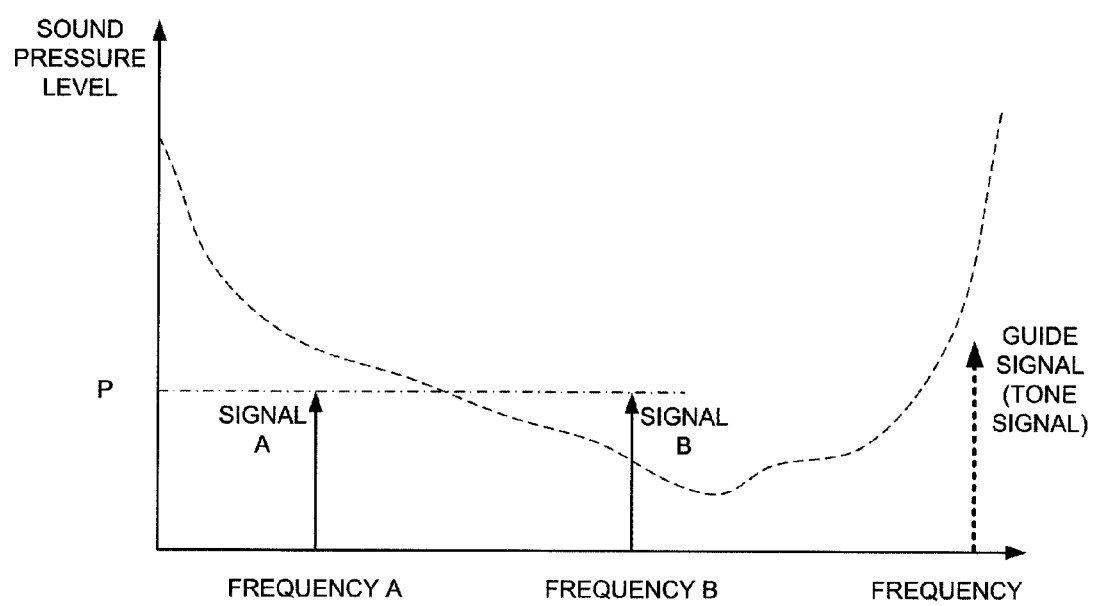
FIG. 9 is a view illustrating a guide signal according to an embodiment of the present disclosure.

According to FIG. 8, the processor 110 of the audio signal processing device 100 may include a content replay unit 111, a detection unit 112, a guide signal generating unit 113, a mixer 114, and an extraction unit 115. The content replay unit 111 may output an original source signal $s(n)$. According to an embodiment of the present disclosure, the content replay unit 111 may apply a volume-related gain v to content (acoustic content, etc.) stored in a storage (not illustrated) of the audio signal processing device 100 or the original source signal $s(n)$ of content received externally by the audio signal processing device 100. The detection unit 112 may determine whether the signal received externally includes a detection target signal (e.g. the guide signal). A description about a detailed operation manner of the detection unit 112 will be provided below. The guide signal generating unit 113 may generate a guide signal e(n) that is a preset signal pattern for determining whether the user wears the acoustic output means 230. According to an embodiment of the present disclosure, the guide signal may be a tone signal having a combination of a preset frequency and a preset intensity (gain). FIG. 9 is a view illustrating the guide signal according to an embodiment of the present disclosure. In a graph of FIG. 9, a horizontal axis indicates a frequency, and a vertical axis indicates a sound pressure level or a magnitude of a sound. A broken line of FIG. 9 means a threshold of quiet (ToQ) and is a line connecting a pressure level or the intensity of a minimum sound that a human may perceive for each frequency. In FIG. 9, signal A and signal B have an identical sound pressure level P but have different frequencies of A and B. At this point, since the intensity of signal B is greater than the ToQ, signal B may be perceived by a human, but since the intensity of signal A is smaller than the ToQ, signal A may not be perceived by the human. In other words, a combination of the frequency and intensity of signal A may not be perceived by the human, but a combination of the frequency and intensity of signal B may be perceived by the human. On the basis of cognitive ability of the human, the guide signal may be the tone signal having the combination of frequency and intensity that may not be perceived by the human. In FIG. 9, signal A may also be used as a guide signal. However, the guide signal according to an embodiment of the present disclosure may not be a signal that is not perceived by a human, and the guide signal may be an audio signal or a preset signal pattern perceivable by a human. According to another embodiment of the present disclosure, the guide signal may be a watermark signal that indicates a source or a rightful person of an audio output signal or includes additional information related to the audio output signal. In embodiments of FIGS. 8 and 10, it is assumed that the guide signal e(n) is a tone signal having a combination of a preset frequency and a preset intensity (gain). Back to FIG. 8, the guide signal generating unit 113 may transmit the generated guide signal e(n) to the mixer 114. The mixer 114 may combine the received original source signal s(n) and the guide signal e(n) to generate the audio output signal x(n). An equation of the audio output signal x(n) that may be generated by the mixer 114 may be arranged as follows.

$$x(n)=v \cdot s(n)+e(n) \qquad \text{[Equation 18]}$$

The mixer 114 may transmit the audio output signal x(n) to the transmission/reception module 120, and the processor 110 may transmit the audio output signal x(n) to the transmission/reception module 220 of the acoustic output device 200 through the transmission/reception module 120 of the audio signal processing unit 100. The audio output signal x(n) having been received by the transmission/reception module 220 of the acoustic output device 200 may be transmitted to the acoustic output means 230 and the audio output signal x(n) may be output as an acoustic through the acoustic output means 230. The microphone 240 of the acoustic output device 200 may acquire an external acoustic while the acoustic output means 230 outputs the acoustic on the basis of the audio output signal x(n), and convert the acquired external acoustic to the input signal m(n). Here, according to whether the user wears the acoustic output means 230, it may be determined how much the external acoustic acquired by the microphone includes the acoustic output by the acoustic output device 200. Alternatively, according to whether the user wears the acoustic output means 230, it may be determined how much the microphone acquires the acoustic output from the acoustic output means 230. Alternatively, according to whether the user wears the acoustic output means 230, it may be determined how much the acoustic based on the audio output signal x(n) reaches the microphone through the acoustic path a(n) formed between the acoustic output means 230 and the microphone 240.

sig_model of FIG. 8 represents a signal model of the input signal m(n) on the basis of elements related to generation of the input signal m(n). Since sig_model of FIG. 8 is identical to that of FIGS. 4 and 5, a description about a process for generating the input signal m(n) from the external acoustic collected by the microphone will be omitted.

The input signal m(n) may be transmitted to the transmission/reception module 120 of the audio signal processing device 100 through the transmission/reception module 220 of the acoustic output device 200. The audio signal processing device 100 may transmit the received input signal m(n) to the extraction unit 115 of the processor 110. The extraction unit 115 may extract a preset object signal from the received signal. Alternatively, the extraction unit 115 may apply various signal processing filters to the received signal to improve acoustic quality of the received signal. According to FIG. 8, the extraction unit 115 receives the input signal m(n) and transmit m'(n) extracted from the input signal m(n) to the detection unit 112. Alternatively, the extraction unit 115 may receive the input signal m(n) and transmit, to the detection unit 112, e'(n) that is a prediction signal of the guide signal e(n) included in the input signal m(n). Alternatively, m(n) and m'(n) may be an identical signal. In the present disclosure, the extraction unit 115 may not be a necessary element and the input signal m(n) received by the transmission/reception module 120 may be directly transmitted to the detection unit 112. The detection unit 112 may compare the received input signal m(n) with the guide signal e(n) received from the guide generating unit 113 and determine whether the user wears the acoustic output means 230 on the basis of the compared result.

Unlike the case of FIG. 4, the guide signal e(n) is a detection target in the embodiment of FIG. 8. When the guide signal e(n) according to an embodiment of the present disclosure is a tone signal, the audio signal processing device 100 according to an embodiment of the present disclosure may be more simply realized. In sig_model of FIG. 8, a(n), $t_{spk}$(n) and $t_{mic}$(n) that change the guide signal e(n) included in the audio output signal x(n) may be modeled with one delay and one gain. Accordingly, the input signal m(n) from which the original source signal s(n) is removed may be derived as the following Equation (19). Since the original source signal s(n) is a value that the audio signal processing device 100 has already known, the original source signal s(n) may be easily removed from the input signal m(n) in a filtering manner or the like.

$$m(n) \approx b(n)(g_a \delta(n-d_a)*g_{spk}\delta(n-d_{spk})*g_{mic}\delta(n-d_{mic})*e(n))+w(n) \approx b(n)g_{tot}\delta(n-d_{tot})e(n)+w(n) \qquad \text{[Equation 19]}$$

In Equation (19), $\delta$(n) denotes an impulse signal, $g_a$, $g_{spk}$, and $g_{mic}$ denote respectively approximated gains of a(n), $t_{spk}$(n), and $t_{mic}$(n), and $d_a$, $d_{spk}$, and $d_{mic}$ denote respectively approximated delays of a(n), $t_{spk}$(n), and $t_{mic}$(n). In addition, $g_{tot}$ may be a total gain that $g_a$, $g_{spk}$, and $g_{mic}$ are all multiplied and $d_{tot}$ may be a total delay that $d_a$, $d_{spk}$, $d_{mic}$ are all added.

Similarly to the non-guide case, a matched filter for detecting a guide signal may be modeled as follows.

$$h(n)=g_{tot}e(N-1+d_{tot}-n)\ 0\le n\le N-1 \quad \text{[Equation 20]}$$

When the guide signal e(n) is applied to the matched filter h(n), the detection result value z(n) as in Equation (7) may be calculated and b'(n) may be determined based on whether the detection result value z(n) is equal to or greater than thr(n). Finally, when b'(n) is 1, the detection unit 112 may determine that the user is not wearing the acoustic output means 230 and when b'(n) is 0, the detection unit 112 may determine that the user is wearing the acoustic output means 230.

Since the guide signal e(n) that is the detection target is simple as a tone signal, Equation (9) for the detection limit value thr(n) may be simplified as follows.

$$thr(n)=k\cdot\max(z(n))=k\cdot g_{tot}\cdot E_x=k'\cdot g_a\cdot E_x \quad \text{[Equation 21]}$$

For the tone signal, a change in energy distribution of a(n), $t_{spk}(n)$ and $t_{mic}(n)$ according to a frequency may be neglected. Accordingly, it is not necessary to perform frequency characteristic analysis (relation to Equation 10) for the tone signal.

When the detection unit 112 determines that the user is wearing the acoustic output means 230 (b'(n)=0), the detection unit 112 may transmit, to the content replay unit 111, a control signal ctrl for starting or restarting replay of content. Alternatively, when the detection unit 112 determines that the user is not wearing the acoustic output means 230 (b'(n)=1), the detection unit 112 may transmit, to the content replay unit 111, a control signal ctrl for pausing or stopping replay of content. Besides, the detection unit 112 (or the processor 100) may control an operation of an external device or a content replay state in various ways on the basis of whether the user wears the acoustic output means 230.

In the foregoing embodiment, it has been described that the audio signal processing device 10 determines whether the user wears the acoustic output means 230. However, according to an embodiment of the present disclosure, the acoustic output device 200 may also determine whether the user wears the acoustic output means 230.

The processor (not illustrated) of the acoustic output device 200 of FIG. 8 may receive the audio output signal x(n) from the audio signal processing device 100 through the transmission/reception module 220. At this point, the audio output signal x(n) may be a signal including the guide signal e(n). Alternatively, the acoustic output device 200 may additionally receive the guide signal e(n) from the audio signal processing device 100 through the transmission/reception module 220. Alternatively, the acoustic output device 200 may include a separate guide signal generating unit (not illustrated). In this case, the acoustic output device 200 may receive, from the audio signal processing device 100, the audio output signal x(n) that does not include the guide signal, and may include the guide signal e(n) generated by the separate guide signal processing unit in the received audio output signal x(n). The processor of the acoustic output device 200 may generate the input signal m(n) by collecting an external acoustic through the microphone 240, while outputting an acoustic based on the audio output signal x(n) through the acoustic output means 230. Here, since the relation between the audio output signal x(n) and the input signal m(n) has been described in relation to FIG. 5, it will be omitted. The processor of the acoustic output device 200 may also include the detection unit (not illustrated). The detection unit of the acoustic output device 200 may compare the guide signal e(n) with the input signal m(n) to determine whether the user wears the acoustic output means 230.

At this point, the detection unit of the acoustic output device 200 may calculate the detection result value z(n) that represents how much the guide signal e(n) is included in the input signal m(n) and when the detection result value z(n) is equal to or greater than a preset detection limit value thr(n), the user may be determined to wear the acoustic output means 230. Here, the detection limit value thr(n) may be determined based on a maximum value of the detection result value z(n). In addition, the detection limit value thr(n) may be determined based on a combination of the energy of the audio output signal and the impulse response energy for the acoustic path between the acoustic output means and the microphone. A detailed description about a comparison manner of e(n) and m(n) of the detection unit of the acoustic output device 200, and detailed descriptions about b(n), b'(n) and thr(n) related to the comparison will be omitted.

When the detection unit of the acoustic output device 200 determines that the user is wearing the acoustic output means 230 (b'(n)=0), the detection unit of the acoustic output device 200 may also transmit a control signal ctrl for requesting to start or restart replay of content to the audio signal processing device 100 or an external audio replay device. In addition, when the detection unit of the acoustic output device 200 determines that the user is not wearing the acoustic output means 230 (b'(n)=1), the detection unit of the acoustic output device 200 may transmit a control signal ctrl for requesting to pause or stop replay of content to the audio signal processing device 100 or an external audio replay device. Besides, the detection unit (or the processor) of the acoustic output device 200 may control an operation of an external device or a content replay state in various ways on the basis of whether the user wears the acoustic output means 230.

Figure 10:
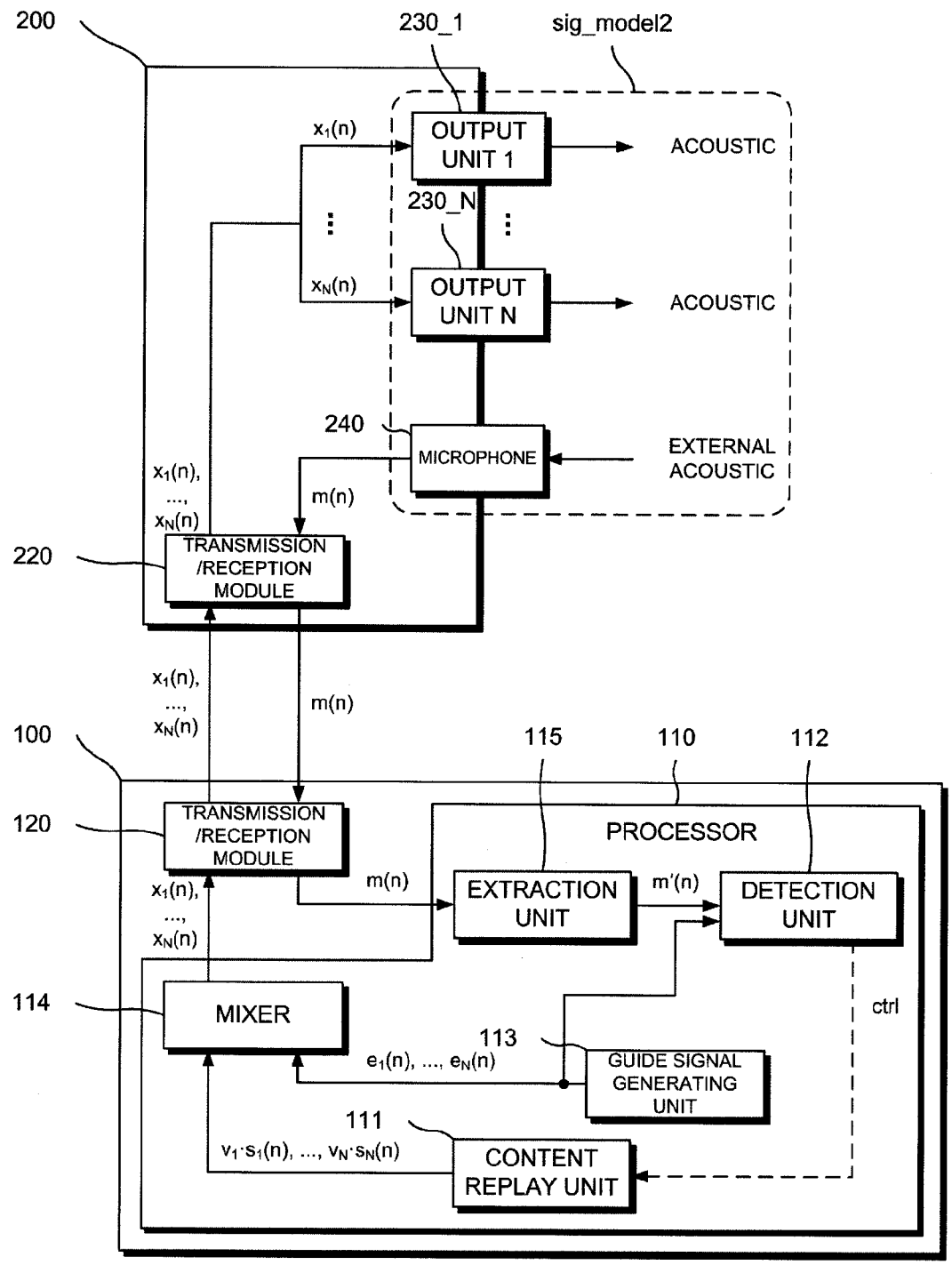
FIG. 10 is a view illustrating another embodiment of a manner for determining whether a user wears an acoustic output device by using a guide signal.

FIG. 10 is a view illustrating another embodiment of a manner for determining whether a user wears an acoustic output device by using a guide signal. FIG. 10 shows that the guide signal of FIG. 8 is applied to the embodiment of FIG. 6 related to the plurality of individual audio signals and the plurality of output units, and overlapping descriptions about each element will be omitted. sig_model2 of FIG. 10 represents a signal model of the input signal m(n) and is the same as the signal model of sig_model2 of FIGS. 6 and 7, and therefore a detailed description thereabout will be omitted.

According to FIG. 10, the plurality of individual audio signals individually include guide signals that are different signal patterns and the processor may individually compare each of the guide signals with the input signal to determine whether each of the output units is worn. A detailed description will be provided as follows.

According to FIG. 10, where there are the plurality of individual audio signals, there may exist a plurality of guide signals $e_1(n)$ to $e_N(n)$ corresponding to respective individual audio signals $x_1(n)$ to $x_N(n)$. At this point, the plurality of guide signals $e_n(n)$ to $e_N(n)$ may have different signal patterns and through this, it may be individually determined whether the user wears each of the output units. According to a manner that the present disclosure is embodied, the plurality of guide signals may be fully uncorrelated. When the guide signal is a tone signal, each of the guide signal may be generated based on different frequencies.

According to an embodiment of the present disclosure, the audio output signal may include two individual audio signals $x_L(n)$ and $x_R(n)$ and the acoustic output means may include two output units—a left output unit 230_L (not illustrated) and a right output unit 230_R (not illustrated). Accordingly, the individual audio signal $x_L(n)$ may be converted to an acoustic through the left output unit 230_L and the individual audio signal $x_R(n)$ may be converted to an acoustic through the right output unit 230_R. It is assumed that each of the numbers of the individual audio signals and the output units is two in a description below. According to an embodiment of the present disclosure, the $x_L(n)$ and $x_R(n)$ may respectively correspond to channel signals of a stereo audio signal.

Referring to FIG. 10, the audio output signal including the two individual audio signals may be arranged as follows.

$$x_L(n)=v \cdot s_L(n)+e_L(n)$$

$$x_R(n)=v \cdot s_R(n)+e_R(n) \quad \text{[Equation 22]}$$

In Equation (22), it is assumed that volume gains respectively applied to original source signals have the same v. Similarly to the case of FIG. 8, since each impulse response of the input signal model sig_model2 may be modeled with one delay and one gain, the microphone input signal m(n) from which the original source signal s(n) is removed may be derived as follows.

$$m(n) \approx b_L(n)(g_{a,L}\delta(n-d_{a,L}) * g_{spk}\delta(n-d_{spk,L}) * \quad \text{[Equation 23]}$$
$$g_{mic}\delta(n-d_{mic,L}) * e_L(n)) +$$
$$b_R(n)(g_{a,R}\delta(n-d_{a,R}) * g_{spk}\delta(n-d_{spk,R}) *$$
$$g_{mic}\delta(n-d_{mic,R}) * e_R(n)) + w(n)$$
$$\approx b_L(n)g_{tot,L}\delta(n-d_{tot,L})e_L(n) +$$
$$b_R(n)g_{tot,R}\delta(n-d_{tot,R})e_R(n) + w(n)$$

For i that is L or R, it is assumed that $a_i(n)$ denotes an impulse response for an acoustic path between an output unit 230_i corresponding to an individual audio signal $x_i(n)$ and the microphone 240, and $t_{spk,i}(n)$ denotes an impulse response of each output unit 230_i, $t_{mic,i}(n)$ denotes an impulse response of the microphone which acquires an acoustic based on each individual audio signal (e.g. when the number of microphone is 1, $t_{mic,L}(n)=t_{mic,R}(n)$). In this case, $g_{a,i}$, $g_{spk,i}$, and $g_{mic,i}$ denote respectively approximated gains of $a_i(n)$, $t_{spk,i}(n)$, and $t_{mic,i}(n)$, $d_{a,i}$, $d_{spk,i}$, and $d_{mic,i}$ denote respectively approximated delays of impulse responses (according to Equation (23), it may be that and $g_{spk,L}=g_{spk,R}=g_{spk}$, and $g_{mic,L}=g_{mic,R}=g_{mic}$). In addition, for i that is L or R, $g_{tot,i}$ may be a total gain that $g_{a,i}$, $g_{spk,i}$, and $g_{mic,i}$ are all multiplied and $d_{tot,i}$ may be a total delay that $d_{a,i}$, $d_{spk,i}$, $d_{mic,i}$ are all added.

On the other hand, in relation to Equation (20), a matched filter for detecting each guide signal may be arranged as follows.

$$h_i(n)=g_{tot,i} \cdot e_i(N-1+d_{tot,i}-n) \text{ where } i=\{L,R\}, \ 0 \le n \le N-1 \quad \text{[Equation 24]}$$

For i that is L or R, when m(n) is applied to each $h_i(n)$, the detection result value $z_i(n)$ as FIG. 7) may be individually calculated. At this point, $thr_L(n)$ and $thr_R(n)$ may be as follows.

$$thr_i(n)=k' \cdot g_{a,i} \cdot E_{x,i} \text{ where } i=\{L, R\} \quad \text{[Equation 25]}$$

In Equation (25), k' denotes a constant, $E_{x,i}$ denotes an energy of each individual audio signal $x_i(n)$. A value of $b'_i(n)$ may be determined based on whether each $z_i(n)$ is equal to or greater than $thr_i(n)$. Finally, when $b'_i(n)$ is 1, the detection unit 112 may determine that the user is not wearing the acoustic output means 230_i and when b'(n) is 0, the detection unit 112 may determine that the user is wearing the acoustic output means 230_i (Table 1). When the microphone 240 is a BC microphone, a determination manner according to Table 2 may be performed.

On the other hand, the acoustic output device 200 according to an embodiment of the present disclosure may determine whether the user individually wears the plurality of output units using the plurality of guide signals. The acoustic output device 200 may receive the audio output signal including the plurality of guide signals from the audio replay device or the audio signal processing device. Alternatively, the acoustic output device 200 may additionally receive the plurality of guide signals from the audio signal processing device 100 through the transmission/reception module 220. Alternatively, the acoustic output device 200 may include a separate guide signal generating unit (not illustrated). In this case, the acoustic output device 200 may receive, from the audio signal processing device 100, the audio output signal x(n) that does not include the guide signal, and may include the plurality of guide signals generated by a separate guide signal processing unit in the received audio output signal x(n). Thereafter, the acoustic output device 200 may compare the plurality of guide signals with the input signal to individually determine whether the user wears the plurality of output units.

Figure 11:
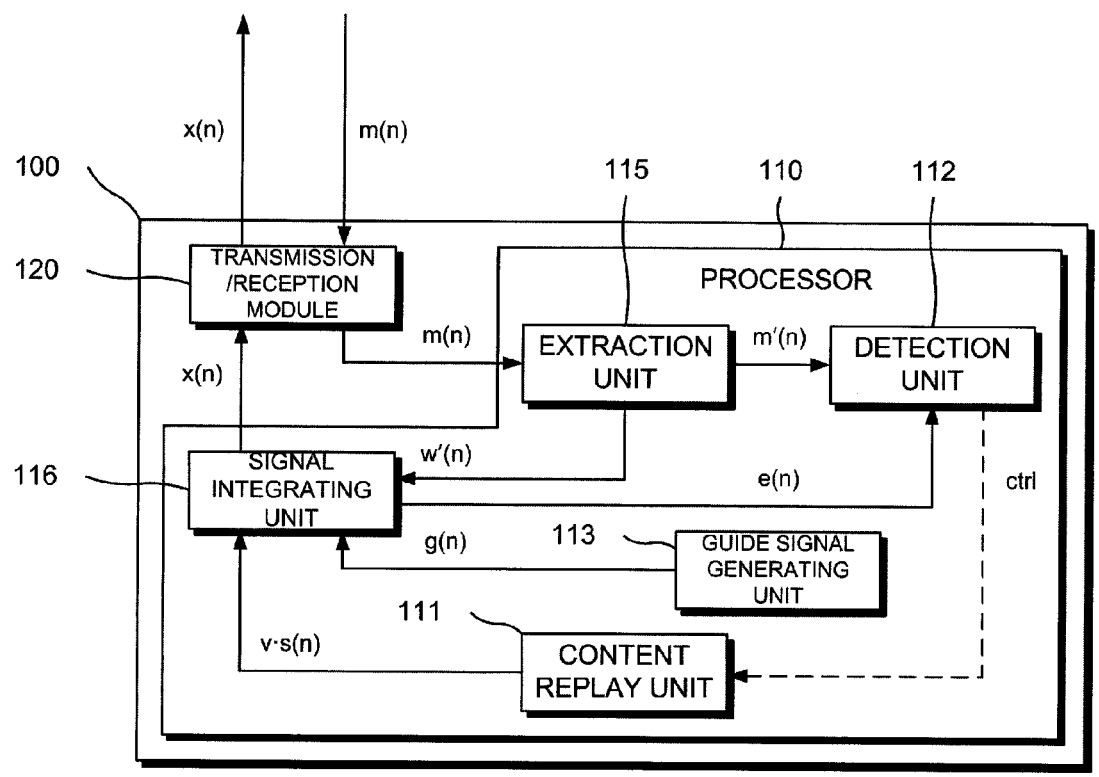
FIG. 11 is a view illustrating another embodiment of a manner for determining whether a user wears an acoustic output device by using a guide signal.

FIG. 11 is a view illustrating another embodiment of a manner for determining whether a user wears an acoustic output device by using a guide signal.

The audio output signal x(n) according to an embodiment of the present disclosure may include a guide signal that is a preset signal pattern for determining whether the acoustic output means is worn. According to the foregoing description, the guide signal may be a tone signal having a combination of the intensity (gain) and a frequency that is not perceivable by a human. However, the present disclosure is not limited thereto, and the guide signal may be an audio signal perceivable by a human. As an example of the guide signal perceivable by a human, there is an audio watermark.

When the guide signal perceivable by a human is included in the audio output signal, the audio signal processing device 100 or the acoustic output device (not illustrated) according to an embodiment of the present disclosure, the intensity (gain) of the guide signal may be adjusted such that the guide signal is masked by the original source signal s(n) of the audio output signal and an inferred ambient noise signal w'(n). A detailed description thereabout will be as follows.

According to FIG. 11, the audio signal processing device 100 may include a content replay unit 111, a guide signal generating unit 113, an extraction unit 115, and a signal integrating unit 116. Same as the cases of FIGS. 8 and 10, the content replay unit 111 may output an original source signal s(n) to which a volume gain v is applied, and the original source signal s(n) to which the volume gain v is applied may be transmitted to the signal integrating unit 116. The guide signal generating unit 113 may generate a guide signal g(n) that is a preset signal pattern, and transmit the generated guide signal g(n) to the signal integrating unit 116. At this point, the guide signal may be an audio watermark perceivable by a human, but is not limited thereto. The signal integrating unit 116 performs a similar operation to the mixer of FIGS. 8 and 10. The signal integrating unit 116 may integrate the original source signal s(n) to which the volume gain v is applied and the guide signal g(n) to generate the audio output signal x(n). Here, the signal integrating unit 116 may apply a separate signal processing procedure for g(n) before including the guide signal g(n) in the audio output signal x(n). When the guide signal g(n) perceivable by a human is included in the audio output signal x(n), an acoustic based on the guide signal g(n) may disturb content appreciation of the user. Therefore, when the guide signal perceivable by a human, it is necessary to mask the guide signal with another sound. At this point, the masking of the guide signal may be performed such that the intensity of the guide signal is adjusted to be smaller than a masking limit value. The masking limit value means a sound pressure level of a listening target, which allows the listening target sound to be perceivable by a human in a situation where other sounds (namely, a masker) exist. Accordingly, the foregoing limitation may be resolved by adjusting the intensity of guide signal to be smaller than the masking limit value that may be formed by another signal component of the audio output signal.

According to an embodiment of the present disclosure, the signal integrating unit 116 may determine the masking limit value using at least a part of an external acoustic collected through the microphone. In detail, the signal integrating unit 116 may determine the masking limit value on the basis of the original source signal s(n) and the inferred ambient noise signal w'(n). Here, the inferred ambient noise signal w'(n) is an ambient noise signal extracted by the extraction unit 115 from an input signal m(n) of a previous frame. In other words, the signal integrating unit 116 may determine the masking limit value for a guide signal g(n) of a current frame on the basis of the original source signal s(n) of the current frame and w'(n) extracted from the input signal m(n) of the previous frame. In addition, the signal integrating unit 116 may make the intensity of the guide signal g(n) smaller than the masking limit value by adjusting the intensity (gain or scale) of the guide signal g(n). According to an embodiment of the present disclosure, the signal integrating unit 116 may use a scale factor calculation function for adjusting the intensity (gain) of the guide signal.

The foregoing masking limit value may be determined according to characteristics of a sound that is a listening target, a type and a frequency of a frequency masker. When a masker of a specific intensity exists in a specific frequency band, a masking limit value that a listening target sound begins to be heard is already experimentally made known. The scale factor calculation function may receive the original source signal s(n) and the inferred ambient noise signal w'(n). The signal integrating unit 116 may recognize energy distributions of s(n) and w'(n) through the scale factor calculation function. In addition, the signal integrating unit 116 may compare the energy distributions according to a frequency band of s(n) and w'(n) with frequency characteristics of the guide signal g(n) through the scale factor calculation function and obtain a gain scf(n) for each frequency band that makes g(n) be masked by s(n) and w'(n). The following equation expresses a scale factor calculation function scf_calc_fn( ) for obtaining scf(n).

$$scf(n) = scf\_calc\_fn(s(n) + w'(n))$$ [Equation 26]

In addition, the guide signal e(n) to which scf(n) is applied may be acquired from the following Equation.

$$e(n) = scf(n) * g(n)$$ [Equation 27]

The scf(n)-applied guide signal e(n) may be included in the audio output signal x(n) through Equation (18) or Equation (22). In addition, the signal integrating unit 116 may transmit the scf(n)-applied guide signal e(n) to the detection unit 112 and may be utilized when determining whether the user wears the acoustic output means by using the guide signal e(n).

On the other hand, FIG. 11 only illustrates the audio signal processing device 100. However, the present disclosure is not limited thereto and the acoustic output device 200 according to an embodiment of the present disclosure may also include the signal integrating unit, and identically perform the processing procedure of FIG. 11 related to the guide signal masking.

Use of the guide signal at the time of determining whether the user wears the acoustic output means (or the output unit) may have effects as follows. For example, when a correlation between the plurality of individual audio signals is very high (i.e. the plurality of individual audio signals are very similar to each other), the audio signal processing device or the acoustic output device may include different guide signals in the respective individual audio signals. Herein, the audio signal processing device or the acoustic output device may compare the input signal with each guide signal to easily determine whether the user wears the acoustic output means (or the output unit). In other words, when the guide signal is used, accuracy of the determination may not be influenced by the correlation between the individual audio signals. Moreover, when the guide signal is used, even when the audio output signal, not the original source signal or the guide signal, is not played, it may be checked whether the user wears the acoustic output means through the guide signal.

According to FIGS. 1 to 11, the audio output signal may be divided into the guide signal that is a preset signal pattern for determining whether the acoustic output means is worn and a non-guide signal that is not the guide signal. For example, according to Equation (18), the audio output signal x(n) may be distinguished into the guide signal e(n) and the non-guide signal v·s(n). In addition, according to Equation (22), even when the audio output signal includes the plurality of individual audio signals, each of the individual audio signal $x_L(n)$ and $x_R(n)$ may be distinguished into the guide signals $e_L(n)$ and $e_R(n)$, and the non-guide signals $v·s_L(n)$ and $v·s_R(n)$. At this point, when the guide signal is included in the audio output signal, the audio signal processing device or the acoustic output device according to an embodiment of the present disclosure may compare the guide signal with the input signal. Alternatively, when only the non-guide signal is include in the audio output signal, the audio signal processing device or the acoustic output device may compare the audio output signal including the non-guide signal with the input signal. In addition, the audio signal processing device or the acoustic output device may determine whether the user wears the acoustic output means on the basis of the compared result.

According to an embodiment of the present disclosure, the audio signal processing device or the acoustic output device may determine whether to add the guide signal to the audio output signal based on the characteristics of the audio output signal. Here, the audio output signal may include the plurality of individual audio signals and the characteristics of the audio output signals may include correlation between the individual audio signals. Accordingly, when the correlation between the individual audio signals is higher than a preset reference correlation, the audio signal processing device or the acoustic output device may add the guide signal to the audio output signal. Moreover, when the correlation between the individual audio signals is lower than the preset reference correlation, the audio signal processing device or the acoustic output device may exclude the guide signal from the audio output signal. However, a manner for determining the characteristics of the audio output signal and whether to add/exclude the guide signal based on the characteristics of the audio output signal are not limited thereto. A detailed description will be provided in relation to FIG. 12.

Figure 12:
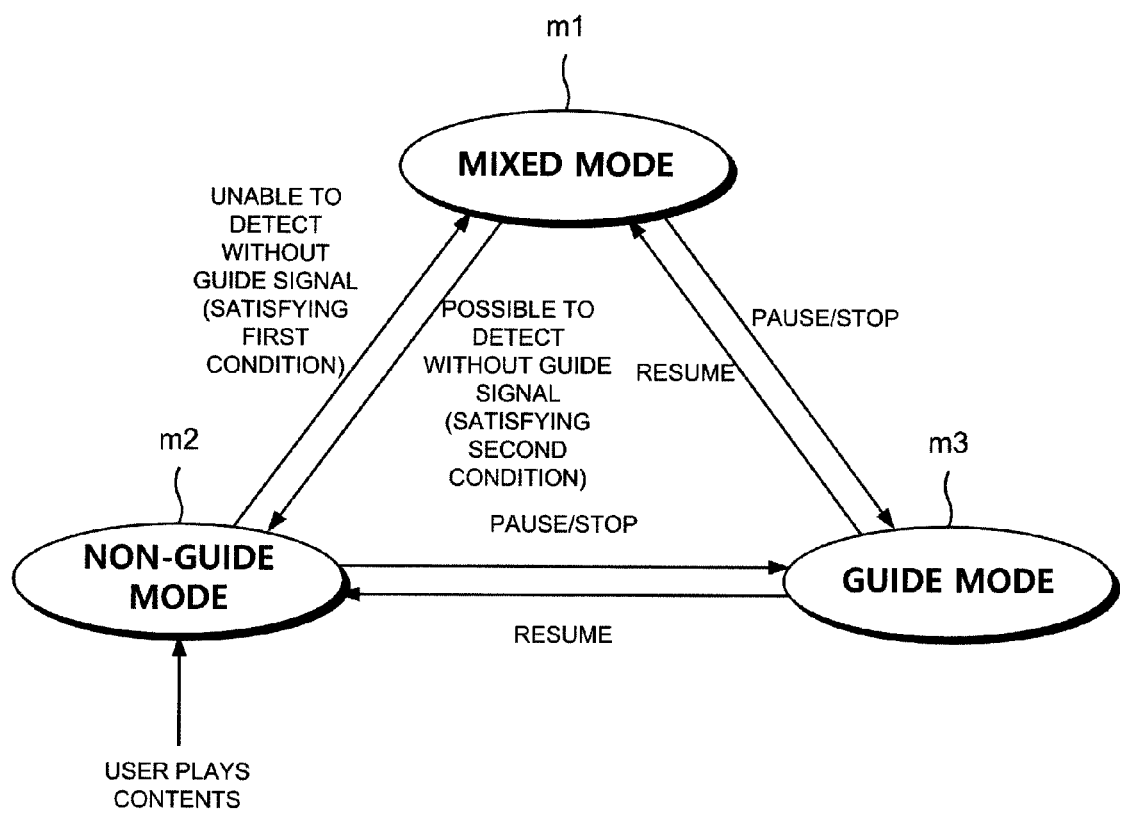
FIG. 12 is a view illustrating an operation manner of an audio signal processing device or an acoustic output device according to an embodiment of the present disclosure.

FIG. 12 is view illustrating an operation manner of an audio signal processing device or an acoustic output device according to an embodiment of the present disclosure. According to FIG. 12, the audio signal processing device or the acoustic output device may operate in a mixed mode m1, a non-guide mode m2, and a guide mode m3. The non-guide mode m2 may be an operation manner of the audio signal processing device or the acoustic output device according to the embodiments of FIGS. 4 to 7, and the guide mode m3 may an operation manner of the audio signal processing device or the acoustic output device according to the embodiments of FIGS. 8 to 11. According to another embodiment of the present disclosure, when the guide signal is included in the audio output signal, the audio signal processing device or the acoustic output device may operate in the guide mode m3 in which the guide signal and the input signal are compared. Alternatively, when the guide signal is not included in the audio output signal (or when the only non-guide signal is included in the audio output signal), the audio signal processing device or the acoustic output device may operate in the non-guide mode m2 in which the audio output signal including the non-guide signal and the input signal are compared. The mixed mode m1 may be an operation manner in which the audio signal processing device or the acoustic output device compares the guide signal with the input signal, when the guide signal and the non-guide signal are both included in the audio output signal.

According to an embodiment of the present disclosure when content is played for the first time by the audio signal processing device, the audio signal processing device or the acoustic output device may operate in one of the non-guide mode m2 and the mixed mode m1. According to FIG. 12, when the content is played under a control of the user, the audio signal processing device or the acoustic output device may operate in the non-guide mode m2. At this point, the content may mean an original source signal of the audio output signal. The original source signal may be the non-guide signal.

In addition, according to another embodiment of the present disclosure, the audio signal processing device or the acoustic output device may select an operation manner (or a mode) based on the characteristics of the audio output signal. Here, the characteristics of the audio output signal may include a type of a signal included in the audio output signal, and the intensity (or volume) of the audio output signal or a signal-to-noise ratio. Alternatively, when the audio output signal may include the plurality of individual audio signals, the characteristics of the audio output signals may include correlation between the individual audio signals.

First, the audio signal processing device or the acoustic output device may determine an operation manner based on the type of the signal included in the audio output signal. According to FIG. 12, when the replay of content is paused or stopped, the audio signal processing device or the acoustic output device operating in the mixed mode m1 or the non-guide mode m2 may change the operation manner to the guide mode m3. In other words, when the replay of content is paused or stopped, a signal value of the original source signal (namely, a non-guide signal) may be turn to 0 or the original source signal may be not included in the audio output signal. In this case, the audio signal processing device or the acoustic output device may change its own operation manner to the guide mode m3. Accordingly, the audio signal processing device or the acoustic output device may include the guide signal in the audio output signal or maintain the guide signal having been already included in the audio output signal. The audio signal processing device or the acoustic output device may determine whether the user wears the acoustic output means by using the guide signal without the original source signal (or the non-guide signal).

In detail, the audio signal processing device or the acoustic output device may add the guide signal to the audio output signal based on the characteristics of the audio output signal. As shown in FIG. 12, during operation in the non-guide mode m2, the audio signal processing device or the acoustic output device may change to the mixed mode m1, when whether the user wears the acoustic output means may not be determined without the guide signal. Here, the case where whether the user wears the acoustic output means may not be determined without the guide signal may mean a case where the characteristics of the audio output signal satisfy a first condition regarding to the signal intensity (volume) or signal correlation. According to an embodiment of the present disclosure, the audio signal processing device or the acoustic output device may determine that the audio output signal satisfies the first condition when the intensity or volume of the audio output signal is smaller than a preset reference signal value. According to another embodiment, the audio signal processing device or the acoustic output device may determine that the audio output signal satisfies the first condition, when a signal-to-noise ratio of the audio output signal is smaller than a preset reference signal-to-noise ratio. According to another embodiment of the present disclosure, when the audio output signal includes the plurality of individual audio signals, the audio signal processing device or the acoustic output device may determine that the audio output signal satisfies the first condition when the correlation between the individual audio signals is higher than a preset reference correlation. The audio signal processing device or the acoustic output device may add the guide signal to the audio output signal, when the audio output signal satisfies the first condition. Accordingly, the audio signal processing device or the acoustic output device changes the operation manner to the mixed mode m1.

According to FIG. 12, during operation in the mixed mode m1, the audio signal processing device or the acoustic output device may change the operation manner to the non-guide mode m2, when whether the user wears the acoustic output means may be determined without the guide signal. Here, the case where whether the user wears the acoustic output means may be determined without the guide signal may mean a case where the characteristics of the audio output signal satisfy a second condition regarding to the signal intensity (volume) or signal correlation. According to an embodiment of the present disclosure, the audio signal processing device or the acoustic output device may determine that the audio output signal satisfies the second condition when the intensity or volume of the audio output signal is equal to or greater than the preset reference signal value. According to the other embodiment, the audio signal processing device or the acoustic output device may determine that the audio output signal satisfies the second condition, when the signal-to-noise ratio of the audio output signal is equal to or greater than the preset reference signal-to-noise ratio. According to the other embodiment of the present disclosure, when the audio output signal includes the plurality of individual audio signals, the audio signal processing device or the acoustic output device may determine that the audio output signal satisfies the second condition, when the correlation between the individual audio signals is smaller than the preset reference correlation. When the audio output signal satisfies the second condition, the audio signal processing device or the acoustic output device may exclude the guide signal from the audio output signal, and accordingly, the audio signal processing device or the acoustic output device changes the operation manner to the non-guide mode m2.

Figure 13:
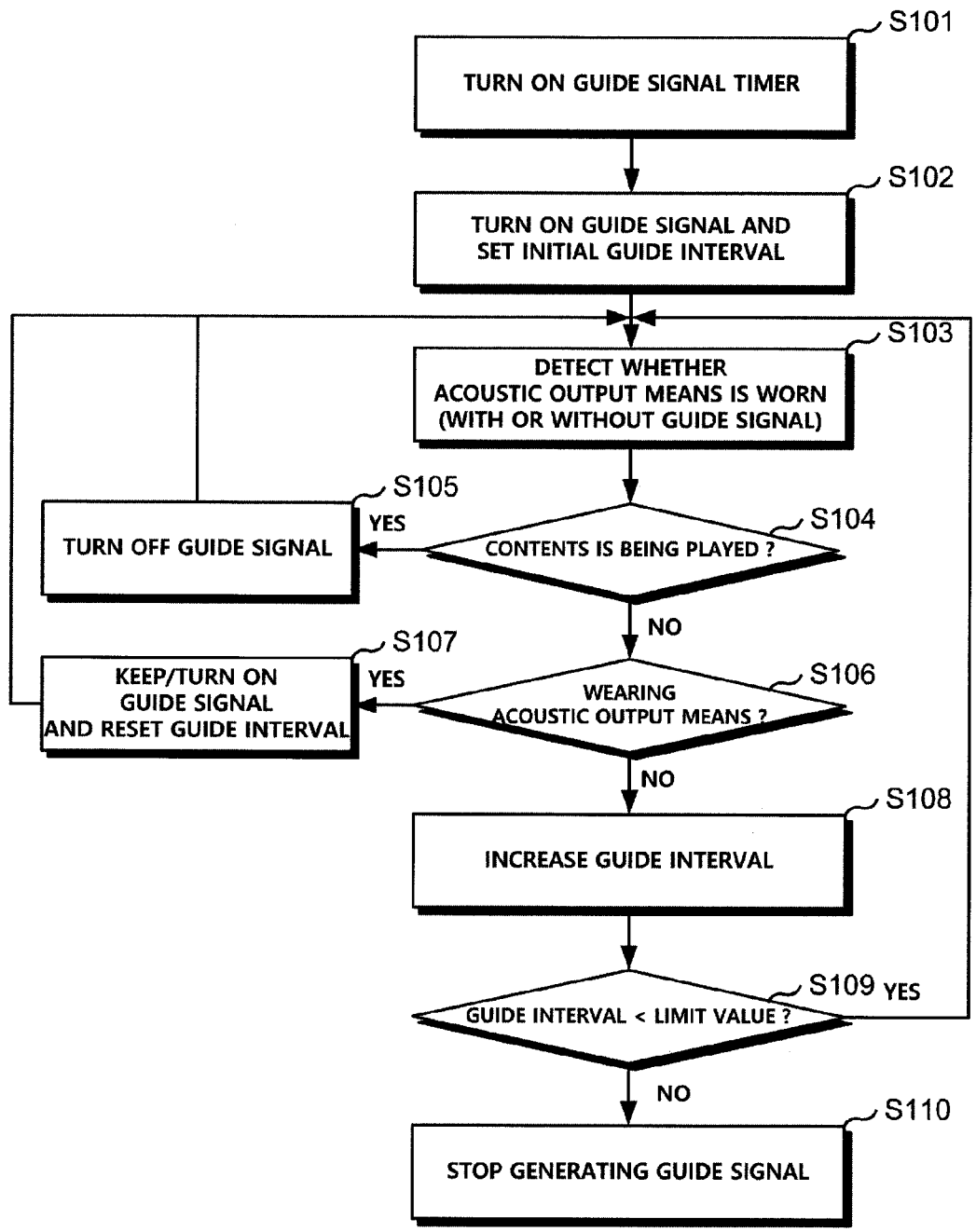
FIG. 13 is a view illustrating an operation manner of an audio signal processing device or an acoustic output device according to another embodiment of the present disclosure.

FIG. 13 is view illustrating an operation manner of an audio signal processing device or an acoustic output device according to another embodiment of the present disclosure.

According to an embodiment of the present disclosure, the audio signal processing device or the acoustic output device may continuously generate the guide signal or generate the guide signal based on a preset guide interval (the generated guide signal may be included in the audio output signal). For example, when the guide interval is 1 second, the audio signal processing device or the acoustic output device may generate the guide signal, which is a tone signal, once per 1 second to include the generated guide signal in the audio output signal. At this point, the guide interval may be decreased or increased based on whether content is played or whether a condition that the user wears the acoustic output means or the like is satisfied.

According to FIG. 13, the audio signal processing device or the acoustic output device may start a guide signal timer (operation S101). In addition, the audio signal processing device or the acoustic output device may generate the guide signal to include the generated guide signal in the audio output signal, and set the initial preset guide interval (operation S102). Then, the audio signal processing device or the acoustic output device may detect whether the user wears the acoustic output means by using the guide signal or the non-guide signal (operation S103). At this point, the audio signal processing device or the acoustic output device may determine whether the content is played (or whether the non-guide signal is included in the audio output signal) (operation S104). When the content is being played, the audio signal processing device or the acoustic output device may stop the generation of the guide signal (operation S105) and return to foregoing operation S103. When the content is not being played, the audio signal processing device or the acoustic output device may determine whether the acoustic output means is worn (operation S106). When the user is determined to wear the acoustic output means, the audio signal processing device or the acoustic output device may generate the guide signal or maintain the generation of the guide signal, and reset or initialize the guide interval (operation S107). In addition, the audio signal processing device or the acoustic output device returns to operation S103. When the user is determined not to wear the acoustic output means, the audio signal processing device or the acoustic output device may increase the guide interval (operation S108). In other words, when the content is not being played and a state where the user does not wear the acoustic output means is continued, the guide interval may be increased and accordingly, the frequency that the guide signal is included in the audio output signal may be decreased. The audio signal processing device or the acoustic output device may compare a current guide interval with a preset limit value (operation S109). When the guide interval is smaller than the limit value, the audio signal processing device or the acoustic output device returns to operation S103. When the guide interval is equal to or greater than the limit value, the audio signal processing device or the acoustic output device may stop the generation of the guide signal (operation S110). For operation S110, unlike operation S105, the audio signal processing device or the acoustic output device may not return to operation S103. Accordingly, operation S110 may represent the state where the generation of the guide signal is completely stopped.

On the other hand, the intensity (or gain or scale) of the guide signal may be determined based on various context information or situations. In particular, in relation to FIG. 11, Equations (26) and (27), the intensity of the guide signal may be determined based on the intensity of an ambient noise and the intensity of the guide signal may also be increased in an environment where the intensity of the ambient noise is strong.

According to the foregoing description, the audio signal processing device or the acoustic output device according to the embodiment of the present disclosure may perform an additional processing such as a change of a content replay state or an operation control for an external device on the basis of whether the user wears the acoustic output means. When it is determined whether the user wears the acoustic output means or the user wears a specific output unit, on the basis of the determined result, a new type user interface (UI) or user experience (UX) may be provided to the user.

According to FIGS. 6 and 8, the audio signal processing device or the acoustic output device may determine whether the user wears each output unit. According to an embodiment of the present disclosure, when a plurality of output units exist, the audio signal processing device or the acoustic output device may provide a notification signal so that the user may wear a proper output unit. Here, it may be assumed that two output units (i.e. a left output unit and a right output unit) are respectively worn in the user's left and right ears. When the user wears the left output unit in his/her ear, the audio signal processing device or the acoustic output device may detect whether the left output unit is worn and output an acoustic "LEFT" through the left output unit (simultaneously, an acoustic "RIGHT" may be also output through the right output unit which is not yet worn). The user may perceive that he/she properly wears the left output unit in his/her left ear through the acoustic "LEFT"

According to another embodiment, the audio signal processing device or the acoustic output device may determine the number of output channels of content (or the audio output signal) based on whether the user wears the acoustic output means. In other words, the audio signal processing device or the acoustic output device may perform up-mixing or down-mixing on the content (or the audio output signal) on the basis of whether the user wears the acoustic output means. For example, it may be assumed that the user appreciates stereo audio content through two output units. When the user removes the right output unit from his/her ear, the audio signal processing device or the acoustic output device may detect that the right output unit is not worn. Accordingly, the audio signal processing device or the acoustic output device may perform down-mixing on the stereo audio content to a mono channel and output the down-mixed content through the left output unit.

Figure 14A:
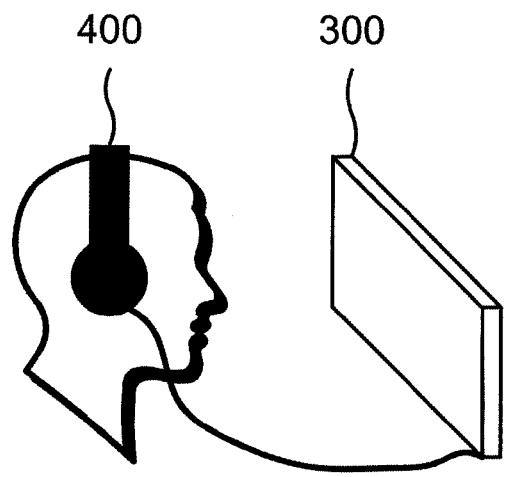
FIGS. 14A to 14C are a view illustrating an application of an audio signal processing device or an acoustic output device according to an embodiment of the present disclosure.
Figure 14B:
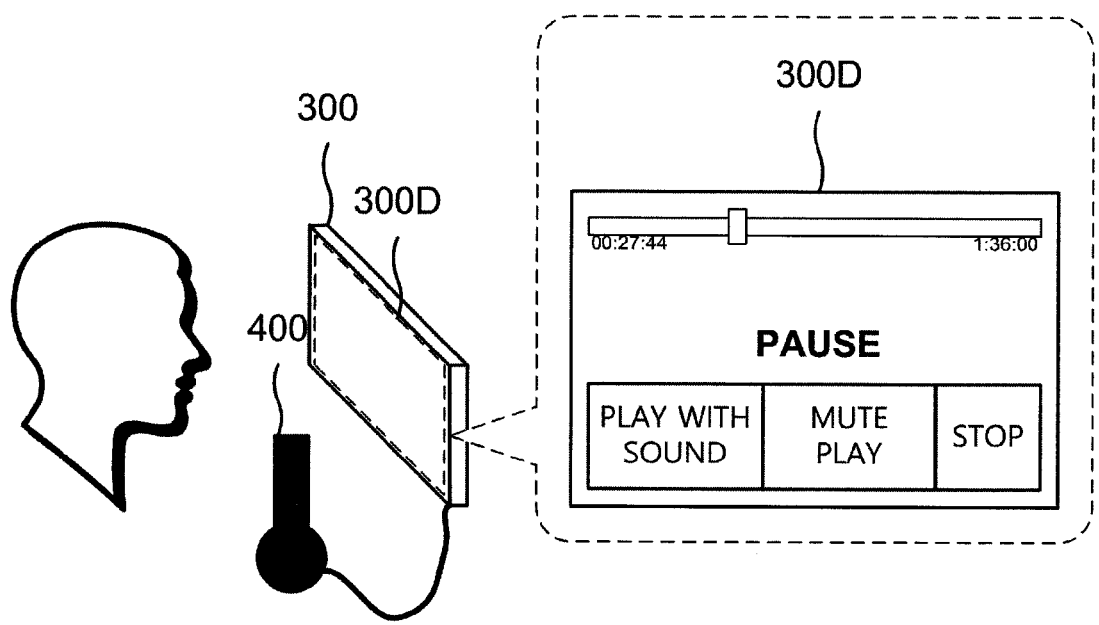
Figure 14C:
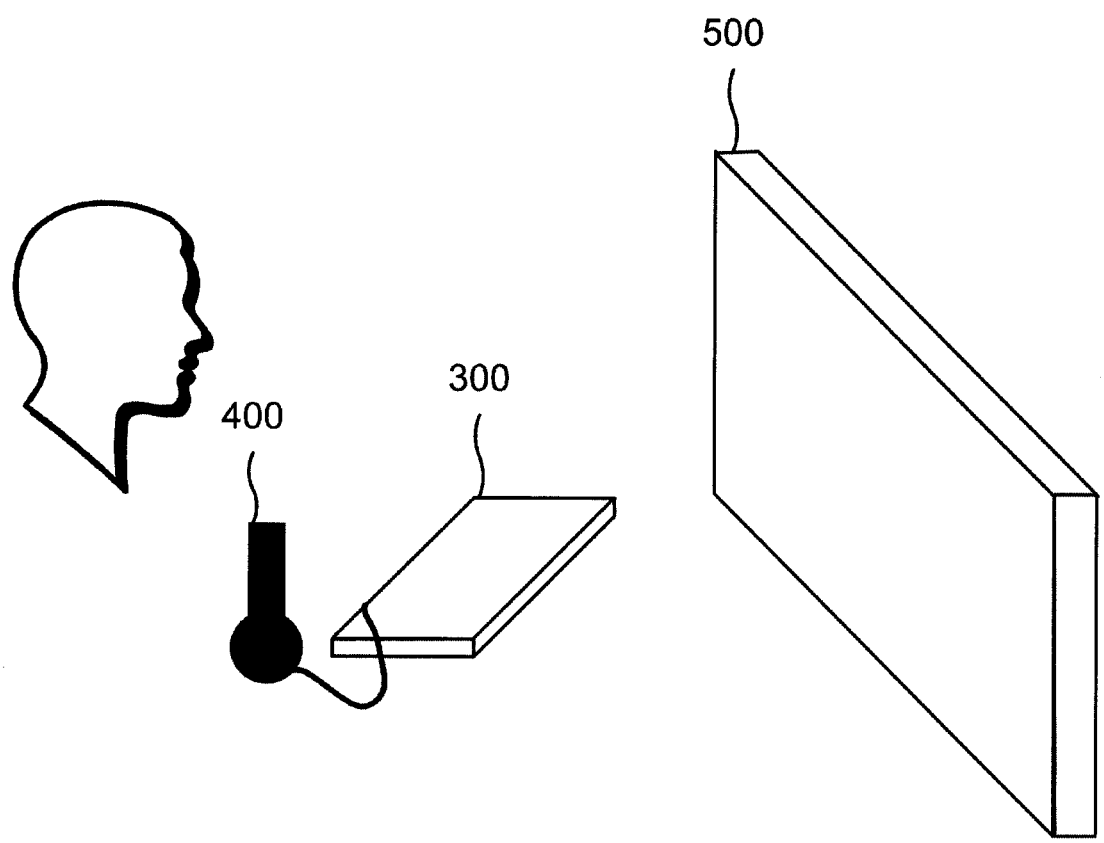

FIGS. 14A to 14C is a view illustrating an application of an audio signal processing device or an acoustic output device according to an embodiment of the present disclosure.

According to FIG. 14A, the user connects headphones 400 to a tablet 300 and is appreciating content such as a movie. Here, the tablet 300 or the headphones 400 may be the audio signal processing device or the acoustic output device according to the embodiment of the present disclosure. In the situation of FIG. 14A, the tablet 300 or the headphones 400 may detect that the user is wearing the headphones 400.

FIG. 14B represents a situation that the user removes the headphones 400. The audio signal processing device or the acoustic output device according to the embodiment of the present disclosure may adjust a content replay state or generate a control signal in relation to the content output on the basis of whether the user wears the acoustic output means. For FIG. 14B, the tablet 300 or the headphones 400 may detect that the user removes the headphones 400. At this point, the tablet 300 may stop the replay of content based on the detected result. In addition, the tablet 300 may output a user menu through a display 300D. The user may select "play with sound" menu in the user menu to restart content appreciation and may appreciate content acoustic output through a speaker embedded in the tablet 300. Alternatively, the user may select "mute play" in the user menu to restart the content appreciation, and then the tablet 300 may not output a separate acoustic. Alternatively, the user may select "stop" in the user menu to completely stop replay of content on the tablet 300. When the user does not select one of user menu within a preset time, the tablet 300 may enter a power saving mode or completely stop the replay of content.

In FIG. 14C, a situation is assumed where wired or wireless networking between devices is smooth. In FIG. 14C, the content played in each device may be shared through the wired or wireless networking.

The audio signal processing device or the acoustic output device according to an embodiment of the present disclosure may determine whether to transmit the content to an external device or generate a control signal related to the content transmission based on whether the user wears the acoustic output means. When the user removes the headphones 400, the tablet 300 or the headphones 400 may detect that the user removes the headphones 400. At this point, immediately after the user removes the headphones 400, the tablet 300 may transmit, to another device such as a large display 500, current replay timing information (current replay proceeding information) about the content that the user has appreciated. The large display 500 may determine the replay timing of the content to be provided to the user on the basis of the received current replay timing information. Through this, the user may appreciate, on the large display 500, the content in succession, which has been appreciated on the tablet 300.

On the other hand, according to FIG. 14C, the user is in a state where the headphones 400 is removed and the tablet 300 lies on the floor. The tablet 300 according to an embodiment of the present disclosure may determine whether to play the content on the tablet 300 or the large display 500 based on whether the headphones 400 are worn and posture information such as inclination on the tablet 300. In other words, in the situation of FIG. 14C, when the user removes the headphones 400 and the screen of the tablet 300 faces an upper side, the tablet 300 plays the content on the large display 500.

Furthermore, the manner for determining whether the user wears the acoustic output means according to the embodiments of the present disclosure is useful when the user receives a call or makes a call. For example, a situation may be assumed in which the user talks over a smartphone that is the audio signal processing device according to the embodiment of the present disclosure or an earphone that is the acoustic output device according to the embodiment of the present disclosure. When the user is wearing an earphone connected to the smartphone, the smartphone or the earphone may detect that the user is wearing the earphone. Accordingly, the voice of the opponent may be output through the earphone and it is less possible that the voice of the opponent leaks externally. When the user removes the earphone, the smartphone or the earphone may detect that the user does not wear the earphone and output the opponent's voice through a speaker embedded in the smartphone. As another example, a situation may be assumed in which the user receives a call in a state of wearing an earphone. The smartphone or the earphone may detect that the user is wearing the earphone and accordingly, a ringtone of the smartphone may be output through the earphone. Through this, the user may receive the call made from the opponent without disturbing other people.

Figure 15:
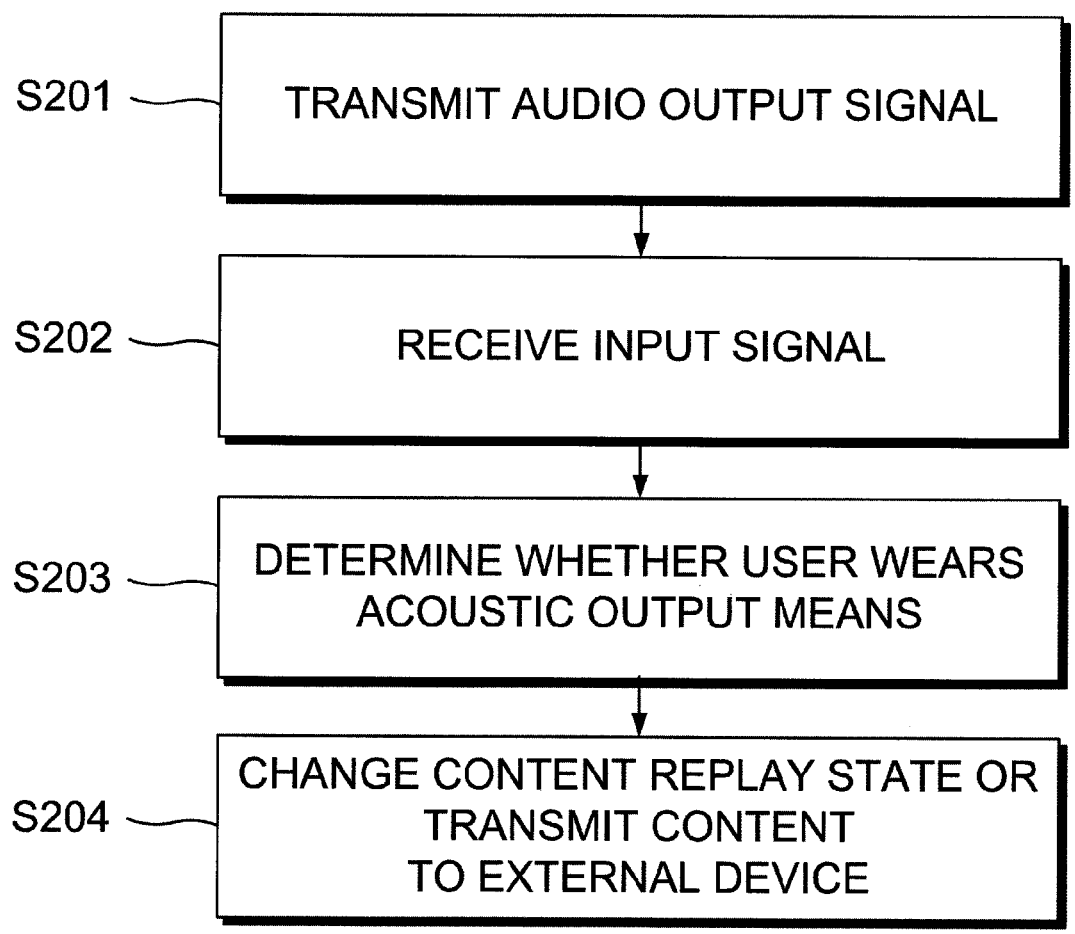
FIG. 15 is a view for illustrating a method for controlling an audio signal processing device according to an embodiment of the present disclosure.

FIG. 15 is a view for illustrating a method for controlling an audio signal processing device according to an embodiment of the present disclosure.

According to FIG. 15, the audio signal processing device may transmit the audio output signal to an external acoustic output device (operation S201). Here, the external acoustic output device may include a microphone and an acoustic output means. In addition, the audio signal processing device may receive, from the external acoustic output device, an input signal to which the acoustic collected through the microphone is converted, while the acoustic output means outputs the acoustic based on the audio output signal (operation S202). Also the audio signal processing device may compare the audio output signal with the input signal to determine whether the user wears the acoustic output means of the external acoustic output device (operation S203). When the user does not wear the external acoustic output device, the audio signal processing device may change a content replay state (e.g. pausing) or transmit the content to an external device (operation S204). Alternatively, the audio signal processing device may provide a menu regarding to various operation manners to the user and perform an additional processing procedure according to the user's selection.

According to an embodiment of the present disclosure, the acoustic output means includes a plurality of output units and the audio output signal includes a plurality of individual audio signals, and the plurality of individual audio signals may be individually converted to the acoustic by the respective output units. In this case, in the determining operation S203, the plurality of individual audio signals are individually compared with the input signal and whether the user wears each of the output units may be determined.

According to another embodiment of the present disclosure, the audio output signal may include a guide signal that is a preset signal pattern. In this case, in the determining operation S203, the guide signal is compared with the input signal and whether the user wears the acoustic output means may be determined. In addition, the operation for transmitting the audio output signal S201 may further include an operation for adjusting an input signal such that the intensity of the guide signal is smaller than a preset masking limit value.

According to another embodiment of the present disclosure, the audio output signal may be distinguished into the guide signal that is a signal pattern preset for determining whether the user wears the acoustic output means and the non-guide signal that is not the guide signal. At this point, in the determining operation S203, when the guide signal is included in the audio output signal, the guide signal is compared with the input signal, and when the non-guide signal is included in the audio output signal, the audio output signal including the non-guide signal is compared with the input signal, and then whether the user wears the output units may be determined. Here, the operation for transmitting the audio output signal S201 may further include an operation for determining whether to add the guide signal to the audio output signal based on characteristics of the audio output signal. Here, the acoustic output means includes a plurality of output units, the audio output signal includes a plurality of individual audio signals, and the plurality of individual audio signals may be individually converted to the acoustic by the respective output units. At this point, in the operation for determining whether to add the guide signal, whether to add the guide signal may be determined based on a correlation between the individual audio signals. Here, in the operation for determining whether to add the guide signal, when the correlation between the individual audio signals is higher than a preset reference correlation, the guide signal may be added to the audio output signal, and when the correlation between the individual audio signals is lower than the preset reference correlation, the guide signal may be excluded from the audio output signal.

According to another embodiment of the present disclosure, in the determining operation S203, a detection result value is calculated which represents how much the audio output signal is included in the input signal, and when the detection result value is equal to or greater than a preset detection limit value, it may be determined that the user wears the acoustic output means. Here, the detection limit value may be determined based on a combination of the energy of the audio output signal and the impulse response energy for an acoustic path between the acoustic output means and the microphone.

Figure 16:
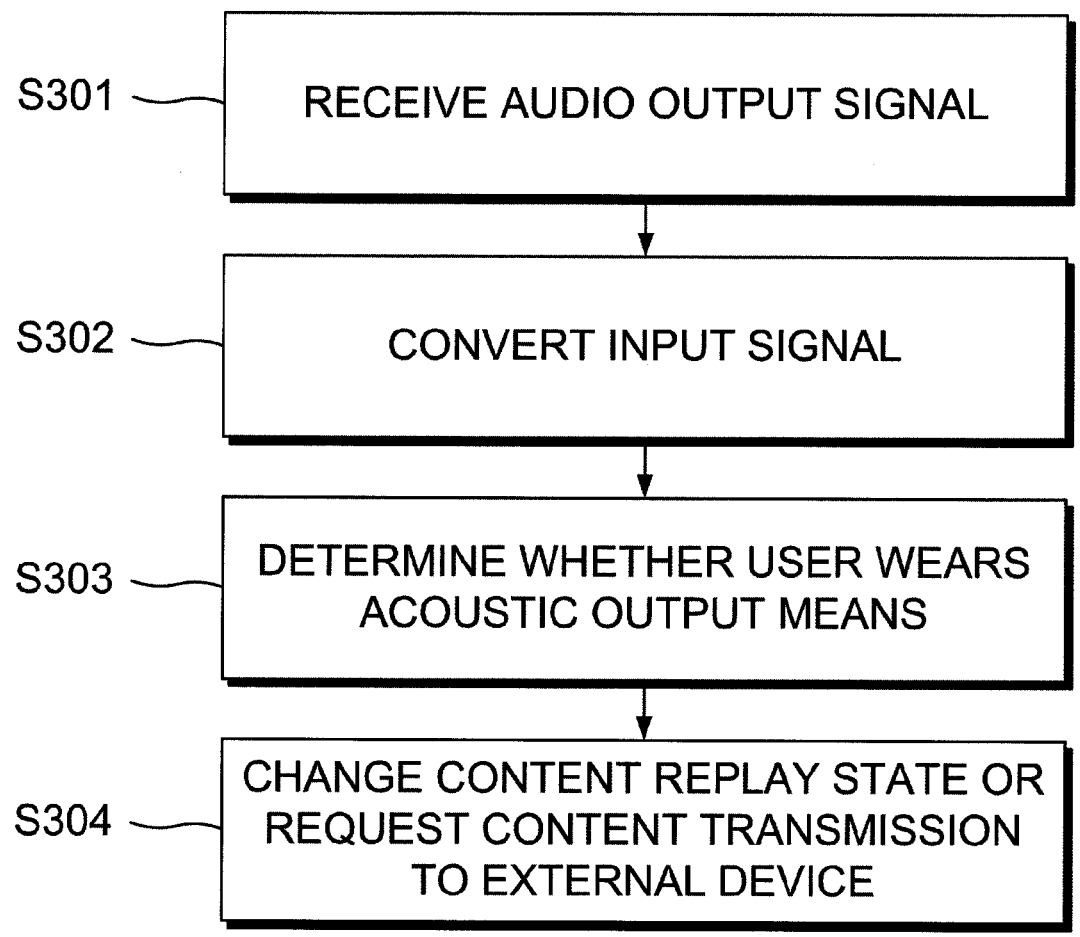
FIG. 16 is a view illustrating a method for controlling an acoustic output device according to an embodiment of the present disclosure.

FIG. 16 is a view illustrating a method for controlling an acoustic output device according to an embodiment of the present disclosure.

According to FIG. 16, the acoustic output device may receive the audio output signal from an external audio replay device (operation S301). Also the acoustic output device may collect an external acoustic to convert the collected external acoustic to an input signal, while the acoustic is output based on the audio output signal (operation S302). In addition, the acoustic output device may compare the audio output signal with the input signal to determine whether the user wears the acoustic output means (operation S303). When the user does not wear the external acoustic output device, the audio signal processing device may change the content replay state (e.g. pausing) or transmit, to the external audio replay device, a control signal for requesting the content to be transmitted to an external device (operation S304). In this case, the audio signal processing device may provide a menu regarding to various operation manners to the user and perform an additional processing procedure according to a user's selection.

According to an embodiment of the present disclosure, the acoustic output means may include a plurality of output units and the audio output signal may include a plurality of individual audio signals. At this point, in the operation for converting to the input signal S302, the plurality of individual audio signals may be individually converted to the acoustic by the respective output units, and in the determining operation S303, the plurality of individual audio signals are individually compared with the input signal to determine whether the user wears each of the output unit.

According to another embodiment, the audio output signal may include a guide signal that is a preset signal pattern. In this case, in the determining operation S303, the guide signal is compared with the input signal to determine whether the user wears the acoustic output means. Also, the operation for receiving the audio output signal S301 may further include an operation for adjusting the intensity of the guide signal to be smaller than a preset masking limit value.

According to another embodiment of the present disclosure, the audio output signal may be distinguished into the guide signal that is the signal pattern preset for determining whether the acoustic output means is worn and the non-guide signal that is not the guide signal. At this point, in the determining operation S303, when the guide signal is included in the audio output signal, the guide signal may be compared with the input signal, and when the non-guide signal is included in the audio output signal, the audio output signal including the non-guide signal may be compared with the input signal to determine whether the user wears the acoustic output means. Here, the operation for receiving the audio output means S301 may further include an operation for determining whether to add the guide signal to the audio output signal based on the characteristics of the audio output signal. Here, the acoustic output means may include a plurality of output units, and the audio output signal may include a plurality of individual audio signal. In this case, in the operation for converting to the input signal S302, the plurality of individual audio signals may be individually converted to the acoustic through each output unit. Also, in the operation for determining whether to add the guide signal, whether to add the guide signal may be determined based on correlation between the individual audio signals. Here, in the operation for determining whether to add the guide signal, when the correlation between the individual audio signals is higher than a preset reference correlation, the guide signal may be added to the audio output signal, and when the correlation between the individual audio signals is lower than the preset reference correlation, the guide signal may be excluded from the audio output signal.

According to another embodiment of the present disclosure, in the determining operation S303, a detection result value is calculated which represents how much the audio output signal is included in the input signal, and when the detection result value is equal to or greater than a preset detection limit value, the user may be determined to wear the acoustic output means. Here, the detection limit value may be determined based on a combination of the impulse response energy for an acoustic path between the acoustic output means and the microphone and the energy of the audio output signal.

According to another embodiment of the present disclosure, the audio signal processing device may control the acoustic output means to output the audio output signal as an acoustic. At this point, the audio signal processing device may be the audio signal processing device or the acoustic output device of FIGS. 1 to 16, and an acoustic output according to the control of the audio signal processing device may be performed in the manner described in FIGS. 1 to 16. In addition, the audio signal processing device may acquire an input signal to which an external acoustic collected through a microphone is converted, while the acoustic is output. Also, the audio signal processing device may compare the audio output signal and the input signal to determine whether the user wears the acoustic output means. The audio signal processing device may acquire the input signal and determine whether the user wears the acoustic output means by using the operation manners of FIGS. 1 to 16. Here, the audio signal processing device may include the acoustic output means and the microphone, and the audio signal processing device including the acoustic output means and microphone may correspond to the acoustic output device according to the embodiment of the present disclosure.

Hereinabove, even though the present disclosure has been described through detailed exemplary embodiments, those skilled in the art may modify and change the present disclosure without departing from the spirit of the present disclosure. Accordingly, it should be construed that that a matter which those skilled in the art can easily analogize from the detailed description and the exemplary embodiments of the present disclosure belongs to the scope of the present disclosure.

What is claimed is:

1. An audio signal processing device configured to transmit and receive an audio signal to and from an external acoustic output device, which comprises a microphone and an acoustic output terminal, the audio signal processing device comprising:
a transceiver configured to transmit and receive a signal to and from the external acoustic output device; and
a processor configured to control an operation of the transceiver,
wherein the processor inserts a guide signal having a preset signal pattern into an audio output signal, transmits the audio output signal to the external acoustic output device through the transceiver, receives, through the transceiver, an input signal to which an external acoustic collected through the microphone is converted while the acoustic output terminal outputs an acoustic on a basis on the audio output signal, and compares the guide signal with the input signal to determine whether a user wears the acoustic output terminal of the external acoustic output device.

2. The audio signal processing device of claim 1, wherein the acoustic output terminal comprises a plurality of output units,
the audio output signal comprises a plurality of individual audio signals comprising respective guide signals that are different signal patterns, and the plurality of individual audio signals are individually converted to the acoustics by the respective output units, and
the processor individually compares each of the guide signals with the input signal to determine whether the user wears each of the output units.

3. The audio signal processing device of claim 1, wherein the audio output signal is distinguished into the guide signal that is a signal pattern preset for determining whether the acoustic output terminal is worn and a non-guide signal that is not the guide signal, and
the processor compares the guide signal and the input signal, when the guide signal is comprised in the audio output signal, and compares the audio output signal comprising the non-guide signal with the input signal, when the non-guide signal is comprised in the audio output signal, to determine whether the user wears that acoustic output terminal.

4. The audio signal processing device of claim 3, wherein the processor determines whether to add the guide signal to the audio output signal based on characteristics of the audio output signal.

5. The audio signal processing device of claim 4, wherein the acoustic output terminal comprises a plurality of output units,
the audio output signal comprises a plurality of individual audio signals, and the plurality of individual audio signals are individually converted to the acoustics by the respective output units, and
the processor determines whether to add the guide signal based on a correlation between the individual audio signals.

6. The audio signal processing device of claim 5, wherein the processor adds the guide signal to the audio output signal, when the correlation between the individual audio signals is higher than a preset reference correlation, and excludes the guide signal from the audio output signal, when the correlation between the individual audio signals is lower than the preset reference correlation.

7. The audio signal processing device of claim 1, wherein the processor calculates a detection result value representing how much the guide signal is comprised in the input signal and determines that the user wears the acoustic output terminal, when the detection result value is equal to or greater than a preset detection limit value, and
the detection limit value is determined based on a combination of an energy of the guide signal and an energy of an impulse response of an acoustic path between the acoustic output terminal and the microphone.

8. An acoustic output device comprising:
a transceiver configured to transmit and receive a signal;
an acoustic output terminal configured to output an acoustic;
a microphone configured to acquire an acoustic; and
a processor configured to control an operation of the acoustic output device,
wherein the processor receives an audio output signal from an external audio replay device through the transceiver, inserts a guide signal having a preset signal patter into the audio output signal, collects an external acoustic through the microphone and converts the external acoustic to an input signal, while an acoustic is output based on the audio output signal through the acoustic output terminal, and compares the guide signal with the input signal to determine whether the user wears the acoustic output terminal.

9. The acoustic output device of claim 8, wherein the acoustic output terminal comprises a plurality of output units,
the audio output signal comprises a plurality of individual audio signals comprising respective guide signals that are different signal patterns, and
the processor individually converts the plurality of individual audio signals to the acoustics through the respective output units, and individually compares each of the guide signals with the input signal to determine whether the user wears each of the output units.

10. The acoustic output device of claim 8, wherein the audio output signal is distinguished into the guide signal that is a signal pattern preset for determining whether the acoustic output terminal is worn and a non-guide signal that is not the guide signal, and
the processor compares the guide signal and the input signal, when the guide signal is comprised in the audio output signal, and compares the audio output signal comprising the non-guide signal with the input signal, when the non-guide signal is comprised in the audio output signal to determine whether the user wears that acoustic output terminal.

11. The acoustic output device of claim 10, wherein the processor determines whether to add the guide signal to the audio output signal based on characteristics of the audio output signal.

12. The acoustic output device of claim 11, wherein the acoustic output terminal comprises a plurality of output units, the audio output signal comprises a plurality of individual audio signals, and the processor individually converts the plurality of individual audio signals to the acoustics through respective output units, and the processor determines whether to add the guide signal based on a correlation between the individual audio signals.

13. The acoustic output device of claim 12, wherein the processor adds the guide signal to the audio output signal, when the correlation between the individual audio signals is higher than a preset reference correlation, and excludes the guide signal from the audio output signal, when the correlation between the individual audio signals is lower than the preset reference correlation.

14. The acoustic output device of claim 8, wherein the processor calculates a detection result value representing how much the audio output signal is comprised in the input signal and determines that the user wears the acoustic output terminal, when the detection result value is equal to or greater than a preset detection limit value, and the detection limit value is determined based on a combination of an energy of the guide signal and an energy of an impulse response of an acoustic path between the acoustic output terminal and the microphone.

15. A method for controlling an audio signal processing device, the method comprising:
inserting a guide signal having a preset signal pattern into an audio output signal;
controlling, by an acoustic output terminal, the audio output signal to be output as an acoustic;
acquiring an input signal to which an external acoustic collected through a microphone is converted during outputting of the acoustic;
comparing the guide signal and the input signal to determine whether a user wears the acoustic output terminal.

16. The method of claim 15, wherein the audio signal processing device comprises the acoustic output terminal and the microphone.

* * * * *